United States Patent
Matsunaga et al.

(10) Patent No.: US 8,383,541 B2
(45) Date of Patent: Feb. 26, 2013

(54) SOLID TITANIUM CATALYST COMPONENT FOR ETHYLENE POLYMERIZATION, ETHYLENE POLYMERIZATION CATALYST AND ETHYLENE POLYMERIZATION METHOD

(75) Inventors: Kazuhisa Matsunaga, Otake (JP); Hideki Yamamoto, Ichihara (JP); Kunio Yamamoto, Yamaguchi (JP); Tetsunori Shinozaki, Ichihara (JP); Kiyoshi Takahashi, Otake (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/101,754

(22) Filed: May 5, 2011

(65) Prior Publication Data
US 2011/0269924 A1 Nov. 3, 2011

Related U.S. Application Data

(63) Continuation of application No. 12/936,669, filed as application No. PCT/JP2009/056972 on Apr. 3, 2009.

(30) Foreign Application Priority Data

| Apr. 8, 2008 | (JP) | 2008-100255 |
| Sep. 5, 2008 | (JP) | 2008-228490 |
| Jan. 14, 2009 | (JP) | 2009-005610 |

(51) Int. Cl.
C08F 4/02 (2006.01)
C08F 2/00 (2006.01)
C08F 110/02 (2006.01)

(52) U.S. Cl. ........ 502/127; 502/125; 502/156; 502/170; 502/172; 526/210; 526/212; 526/213; 526/352

(58) Field of Classification Search ............ 526/213; 502/127, 125
See application file for complete search history.

(56) References Cited

U.S. PATENT DOCUMENTS
4,330,649 A 5/1982 Kioka et al.
(Continued)

FOREIGN PATENT DOCUMENTS
CN 1642994 A 7/2005
EP 0 585 869 A1 3/1994
(Continued)

OTHER PUBLICATIONS
International Search Report in PCT/JP2009/056972 dated Jun. 30, 2009.
(Continued)

Primary Examiner — David W Wu
Assistant Examiner — Elizabeth Eng
(74) Attorney, Agent, or Firm — Foley & Lardner LLP

(57) ABSTRACT

Provided are a solid titanium catalyst component for ethylene polymerization which can polymerize ethylene at a high activity and which can provide an ethylene polymer having an excellent particle property, an ethylene polymerization catalyst and an ethylene polymerization method in which the catalyst is used. The solid titanium catalyst component (I) for ethylene polymerization according to the present invention is obtained by bringing a liquid magnesium compound (A) including a magnesium compound, an electron donor (a) having 1 to 5 carbon atoms and an electron donor (b) having 6 to 30 carbon atoms into contact with a liquid titanium compound (C) under the presence of an electron donor (B) and includes titanium, magnesium and a halogen. The ethylene polymerization catalyst of the present invention includes the component (I) and an organic metal compound catalyst component (II). Further, the ethylene polymerization method of the present invention is a method for polymerizing ethylene under the presence of the catalyst.

6 Claims, 1 Drawing Sheet

U.S. PATENT DOCUMENTS

| | | | |
|---|---|---|---|
| 4,401,589 | A | 8/1983 | Kioka et al. |
| 4,673,719 | A | 6/1987 | Kioka et al. |
| 4,952,649 | A * | 8/1990 | Kioka et al. ............... 526/125.3 |
| 5,223,466 | A | 6/1993 | Lee et al. |
| 6,034,025 | A * | 3/2000 | Yang et al. .................... 502/126 |
| 6,395,670 | B1 | 5/2002 | Morini et al. |
| 7,220,696 | B2 | 5/2007 | Matsunaga et al. |
| 7,649,062 | B2 * | 1/2010 | Matsunaga et al. ........ 526/124.3 |
| 2008/0125555 | A1 | 5/2008 | Matsunaga et al. |
| 2008/0293898 | A1 | 11/2008 | Higuchi et al. |
| 2009/0069515 | A1 * | 3/2009 | Matsunaga et al. ........ 526/124.9 |

FOREIGN PATENT DOCUMENTS

| | | |
|---|---|---|
| EP | 1 609 805 A1 | 12/2005 |
| EP | 1840138 A1 * | 10/2007 |
| JP | 56-000811 | 1/1981 |
| JP | 58-083006 | 5/1983 |
| JP | 04-091103 A | 3/1992 |
| JP | 04-091107 A | 3/1992 |
| JP | 07-062014 A | 3/1995 |
| JP | 09-328514 A | 11/1997 |
| JP | 10-053612 | 3/1998 |
| JP | 2003-026719 A | 1/2003 |
| JP | 2004-018697 | 1/2004 |
| JP | 2005-213367 A | 8/2005 |
| WO | WO 00/75197 A1 | 12/2000 |
| WO | WO-2006/011334 A1 | 2/2006 |

OTHER PUBLICATIONS

Office Action in U.S. Appl. No. 12/936,669 dated Jan. 5, 2011.
Office Action in U.S. Appl. No. 12/936,669 dated Jul. 26, 2011.
Office Action mailed Feb. 23, 2012 in Chinese Application No. 200980112197.5.
Supplementary European Search Report EP 09 73 0343 dated Jul. 6, 2012.

* cited by examiner

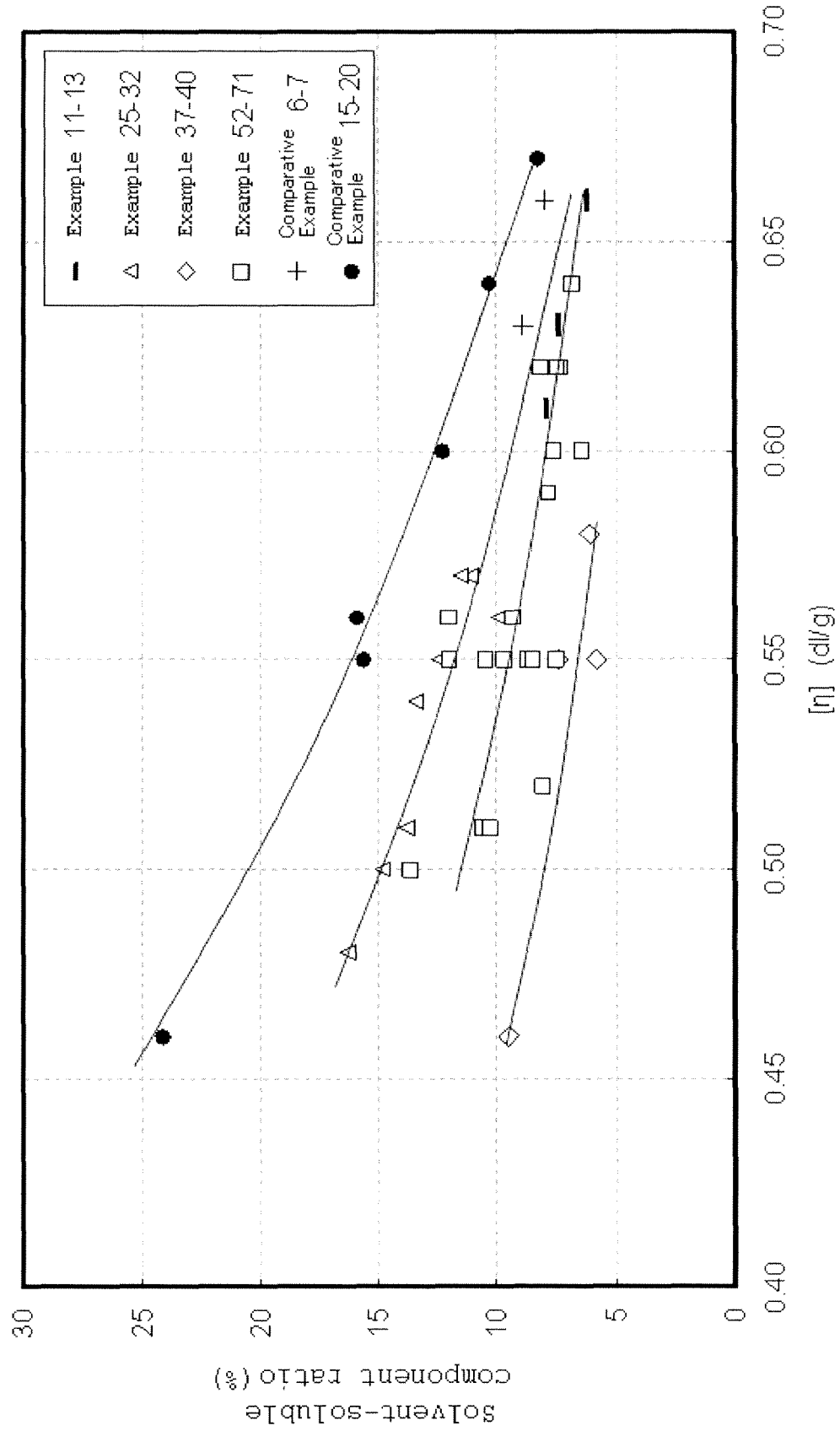

SOLID TITANIUM CATALYST COMPONENT FOR ETHYLENE POLYMERIZATION, ETHYLENE POLYMERIZATION CATALYST AND ETHYLENE POLYMERIZATION METHOD

CROSS-REFERENCE TO RELATED PATENT APPLICATIONS

This application is a Continuation of U.S. application Ser. No. 12/936,669, filed Oct. 6, 2010, which is a PCT National Phase application of PCT/JP2009/056972, filed Apr. 3, 2009, which claims Paris Convention Priority from Japan Application 2009-005610, filed Jan. 14, 2009, which also claims Paris Convention Priority from Japan Application 2008-228490, filed Sep. 5, 2008, and which also claims Paris Convention Priority from Japan Application 2008-100255, filed Apr. 8, 2008, the entire contents of which applications are incorporated by reference herein.

FIELD OF THE INVENTION

The present invention relates to a solid titanium catalyst component for ethylene polymerization, an ethylene polymerization catalyst and an ethylene polymerization method, each of which provides an ethylene polymer having less solvent-soluble components and a good particle property at a very high activity and each of which is excellent in a molecular weight-controlling performance.

BACKGROUND OF THE INVENTION

Ethylene polymers such as homopolyethylene and linear low density polyethylene (LLDPE) are excellent in a transparency, a mechanical strength and the like and widely used as a film and the like. Various production methods for the ethylene polymers have so far been known, and it is known that use of a solid titanium catalyst comprising a titanium catalyst component containing titanium, magnesium, a halogen and an electron donor as an optional component makes it possible to produce ethylene polymers at a high polymerization activity. In particular, it is described in a patent document 1 that a catalyst for ethylene polymerization comprising as a titanium catalyst component, a solid titanium catalyst component obtained by bringing a halogen-containing magnesium compound prepared in a liquid state into contact with a liquid titanium compound and an organic silicon compound having no active hydrogens shows a high activity. Further, it is described in a patent document 2 that polymers having excellent particle properties are produced by using an olefin polymerization catalyst comprising an aluminum compound selected from aluminosiloxane, a reaction product of alkylaluminum and calixarene and a reaction product of alkylaluminum and cyclodextrin, a halogen-containing magnesium compound and a titanium compound.

On the other hand, if ethylene can be polymerized at a higher activity in producing the ethylene polymers, not only the productivity is improved, but also a catalyst residue per polymer, particularly a halogen amount is reduced, and therefore problems such as generation of rust on a die in molding can be resolved. Accordingly, a titanium catalyst component which can polymerize ethylene at a higher activity is desired.

Polymers obtained by polymerizing ethylene are usually obtained in a powder form regardless of a slurry method, a gas phase method and the like. In this case, they are preferably ethylene polymers which do not contain fine powders and have a narrow particle size distribution and which are excellent in a particle flowability. The ethylene polymers which are excellent in particle properties have various advantages that they can be used as they are without pelletizing depending on uses.

Further, known is a method in which a molecular weight distribution is broadened by multistage polymerization in order to obtain a film which is excellent in a transparency and a mechanical strength. Usually, a molecular weight is controlled by adding hydrogen, but the activity tends to be reduced when elevating an amount of hydrogen to produce a low molecular weight part. That is, a catalyst which can control a molecular weight with a small amount of hydrogen is advantageous in terms of an activity even in multistage polymerization. Accordingly, an ethylene polymerization catalyst having an excellent property of controlling a molecular weight by hydrogen, which is called a hydrogen response, is desired.

Also, a polymerization solvent-soluble component tends to be increased when producing a low molecular weight part by multistage polymerization, and by product comprising the soluble component is desired to be reduced for the sake of a yield of the product and environmental correspondence.

Patent document 1: JP 1997-328514A
Patent document 2: JP 1998-53612A

DISCLOSURE OF THE INVENTION

In light of the background described above, an object of the present invention is to provide a solid titanium catalyst component for ethylene polymerization which can polymerize ethylene at a high activity, which is excellent in a hydrogen response, which by-produces less solvent-soluble component and which can produce an ethylene polymer having a good particle property, an ethylene polymerization catalyst and an ethylene polymerization method in which the catalyst is used.

The present inventors have investigated the problems in order to solve them. As a result, they have found, to be surprised, that a solid titanium catalyst component (I) for ethylene polymerization obtained by bringing a liquid magnesium compound (A) comprising a magnesium compound and two or more kinds of electron donors having a specific number of carbon atoms into contact with a liquid titanium compound (C) under the presence of an electron donor (B) can solve the problems, and thus they have completed the present invention.

That is, the present invention provides: a solid titanium catalyst component (I) for ethylene polymerization, which is obtained by bringing a liquid magnesium compound (A) comprising a magnesium compound, an electron donor (a) having 1 to 5 carbon atoms and an electron donor (b) having 6 to 30 carbon atoms into contact with a liquid titanium compound (C) under the presence of an electron donor (B) and which comprises titanium, magnesium and a halogen.

The molar ratio ((a)/(b)) of the used amount of the electron donor (a) to the used amount of the electron donor (b) is preferably less than 1, and the electron donor (a), the electron donor (b) and the electron donor (B) are preferably hetero atom-containing compounds excluding cyclic ether compounds.

The electron donor (a) is preferably an alcohol having 1 to 5 carbon atoms, and the electron donor (b) is preferably an alcohol having 6 to 12 carbon atoms.

The electron donor (B) is preferably a dicarboxylic ester compound or at least one compound selected from the group consisting of acid halides, acid amides, nitriles, acid anhydrides, organic acid esters and polyethers.

More preferred aspects of the electron donor (B) include a compound represented by the following Formula (2), a diether compound represented by the following Formula (3) or a mixture of an organic acid ester having 2 to 18 carbon atoms and the diether compound represented by the following Formula (3).

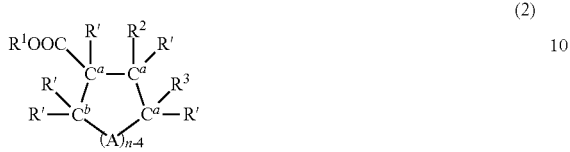

(2)

In Formula (2), $C^a$ and $C^b$ represent a carbon atom; n represents an integer of 5 to 10; $R^2$ and $R^3$ each are independently $COOR^1$ or R', and at least one of $R^2$ and $R^3$ is $COOR^1$; in a cyclic framework, any carbon-carbon bond other than a $C^a$-$C^a$ bond and a $C^a$-$C^b$ bond when $R^3$ is a hydrogen atom may be substituted with a double bond.

A plurality of $R^1$ is a hydrocarbon group having 1 to 20 carbon atoms.

A plurality of R' each is independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group.

A is a structure represented by the following formula or a hetero atom excluding an oxygen atom:

A plurality of R' is the same as R' described above.

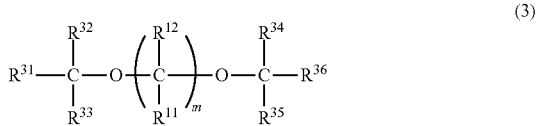

(3)

In Formula (3), m represents an integer of 1 to 10; $R^{11}$, $R^{12}$ and $R^{31}$ to $R^{36}$ each are independently a hydrogen atom or a substituent having at least one element selected from carbon, hydrogen, oxygen, fluorine, chlorine, bromine, iodine, nitrogen, sulfur, phosphorus, boron and silicon.

Any ones of $R^{11}$, $R^{12}$ and $R^{31}$ to $R^{36}$ may be linked together to form a ring other than a benzene ring, and a main chain may contain an atom other than carbon.

The ethylene polymerization catalyst of the present invention is characterized by comprising the solid titanium catalyst component (I) for ethylene polymerization and an organic metal compound catalyst component (II).

The ethylene polymerization method of the present invention is characterized by homopolymerizing ethylene or copolymerizing ethylene with other olefins under the presence of the ethylene polymerization catalyst.

ADVANTAGEOUS OF THE INVENTION

The solid titanium catalyst component for ethylene polymerization, the ethylene polymerization catalyst and the ethylene polymerization method according to the present invention make it possible to produce an ethylene polymer which contains less solvent-soluble components and which is excellent in a particle form with an excellent hydrogen response at a high activity. Further, they are excellent in controlling a molecular weight and a molecular weight distribution of the ethylene polymer obtained.

BRIEF EXPLANATION OF THE DRAWINGS

FIG. 1 is a graph showing relation between a intrinsic viscosity [η] and a solvent-soluble component rate out of the results of ethylene polymerization described in the examples and the comparative examples.

PREFERRED EMBODIMENT OF THE INVENTION

The solid titanium catalyst component (I) for ethylene polymerization, the ethylene polymerization catalyst comprising the catalyst component (I) and the ethylene polymerization method according to the present invention shall be explained below. In the present invention, the term of "polymerization" may be used in the meaning that it includes not only homopolymerization but also copolymerization, and the term of "polymer" may be used in the meaning that it includes not only a homopolymer but also a copolymer.

<Solid Titanium Catalyst Component (I) for Ethylene Polymerization>

The solid titanium catalyst component (I) for ethylene polymerization according to the present invention is obtained by bringing the liquid magnesium compound (A) comprising the magnesium compound, the electron donor (a) and the electron donor (b) into contact with the liquid titanium compound (C) under the presence of the electron donor (B) and comprises titanium, magnesium and a halogen. The solid titanium catalyst component (I) for ethylene polymerization obtained by bringing the liquid magnesium compound (A) into contact with the liquid titanium compound (C) under the presence of the electron donor (B) is excellent in a hydrogen response, produces less solvent-soluble components, and tends to be liable to provide an ethylene polymer which is excellent in a particle form. The liquid magnesium compound (A), the electron donor (B) and the liquid titanium compound (C) shall be explained below.

Liquid Magnesium Compound (A):

Representative examples of a method for obtaining the liquid magnesium compound (A) used for preparing the solid titanium catalyst component (I) for ethylene polymerization according to the present invention include a method bringing a publicly known magnesium compound into contact with the electron donor (a) and the electron donor (b) each described later preferably under the presence of a liquid hydrocarbon medium to turn them into a liquid. The magnesium compounds include, for example, magnesium compounds described in Japanese Patent Application Laid-Open No. 83006/1983 and Japanese Patent Application Laid-Open No. 811/1981. In particular, solvent-soluble magnesium compounds are preferably used.

To be specific, capable of being used are publicly known magnesium compounds having no reducing ability, including:

magnesium halides such as magnesium chloride and magnesium bromide;

alkoxymagnesium halides such as methoxymagnesium chloride and ethoxymagnesium chloride;

aryloxymagnesium halides such as phenoxymagnesium chloride;

alkoxymagnesiums such as ethoxymagnesium, isopropoxymagnesium, butoxymagnesium and 2-ethylhexoxymagnesium;

aryloxymagnesiums such as phenoxymagnesium;

carboxylates of magnesium such as magnesium stearate.

On the other hand, organic magnesium compounds and organic magnesium halide compounds represented by Grignard reagents can be used as well.

The magnesium compounds may be used alone or in combination of two or more kinds thereof. Further, the magnesium compounds may be complex compounds with other metals, double compounds or mixtures thereof with other metal compounds.

Among them, magnesium halides, particularly magnesium chloride is preferably used, and in addition thereto, alkoxymagnesium such as ethoxymagnesium is preferably used as well. Further, organic magnesium compounds having a reducing ability such as Grignard reagents, which are brought into contact with titanium halides, silicon halides and alcohol halides, may be used.

Two or more kinds of the electron donors used for preparing the liquid magnesium compound (A) are preferably the electron donor (a) having 1 to 5 carbon atoms and the electron donor (b) having 6 to 30 carbon atoms. To be specific, alcohols, aldehydes, amines, carboxylic acids and mixtures thereof each satisfying the respective prescribed carbon atom numbers are preferably used.

The following compounds can be listed as the specific examples of the electron donor (a).

The alcohols are preferably alcohols having 1 to 5 carbon atoms and include, for example, methanol, ethanol, n-propanol, isopropanol, n-butanol, isobutanol, ethylene glycol and n-pentanol. Among them, alcohols having 1 to 3 carbon atoms which have less carbon atoms are preferred. They are more preferably ethanol, n-propanol and isopropanol, particularly preferably ethanol.

The aldehydes include ethanal (acetaldehyde), propanal, n-butanal and n-pentanal.

The amines include ethylamine, diethylamine, trimethylamine, diethylmethylamine and the like.

The carboxylic acids include acetic acid, propionic acid, butanoic acid, pentanoic acid and the like.

The compounds can be used in combination of two or more kinds thereof.

Among the compounds, the alcohols are particularly preferably used.

In general, the electron donor (a) has a high reactivity with the organic metal compound catalyst component (II) described later and develops quickly a catalyst activity, and therefore the catalyst having a high polymerization activity for ethylene is obtained in many cases.

The electron donor (b) having 6 to 30 carbon atoms, more preferably 6 to 20 carbon atoms is used.

The specific examples of the alcohol which is the electron donor (b) include:

aliphatic alcohols such as hexanol, 2-methylpentanol, 2-ethylbutanol, n-heptanol, n-octanol, 2-ethylhexanol, decanol and dodecanol;

alicyclic alcohols such as cyclohexanol and methylcyclohexanol;

aromatic alcohols such as benzyl alcohol and methylbenzyl alcohol; and alkoxy group-containing aliphatic alcohols such as n-butyl cellosolve. Among them, the aliphatic alcohols are used.

Examples of the aldehydes include aldehydes having 7 or more carbon atoms such as capric aldehyde and 2-ethylhexylaldehyde.

Examples of the amines include amines having 6 to 30 carbon atoms such as heptylamine, octylamine, nonylamine, laurylamine and 2-ethylhexylaminde.

Examples of the carboxylic acids include the organic carboxylic acids having 6 to 30 carbon atoms such as caprylic acid and 2-ethylhexanoic acid.

The electron donor (b) tends to make it possible to solubilize the magnesium compound with a small amount (mole unit).

The electron donor (b) is preferably alcohols, and alcohols having 6 to 12 carbon atoms are more preferably used. The specific preferred examples thereof are aliphatic alcohols such as hexanol, 2-ethylhexanol, decanol and dodecanol, and they are particularly preferably 2-ethylhexanol.

In combination of the electron donor (a) and the electron donor (b), both of them are preferably alcohols.

The used amounts of the magnesium compound, the electron donor (a) and the electron donor (b) in preparing the liquid magnesium compound (A) are, though varied depending on the kinds thereof and the contact conditions, 0.1 to 20 mol, preferably 0.2 to 10 mol and more preferably 0.2 to 8 mol for the electron donor (a) based on 1 mol of the magnesium compound and 0.5 to 20 mol, preferably 1 to 10 mol and more preferably 1 to 5 mol for the electron donor (b) based on the same. Also, the total of the electron donor (a) and the electron donor (b) accounts for 1.1 to 25 mol, more preferably 1.5 to 10 mol and further preferably 2 to 5 mol based on 1 mol of the magnesium compound.

The electron donor (a) is used preferably in a smaller amount than that of the electron donor (b). To be specific, (the used amount (mol) of the electron donor (a))/(the used amount (mol) of the electron donor (b)) is preferably less than 1, more preferably less than 0.8, further preferably less than 0.6, particularly preferably less than 0.5 and especially preferably less than 0.4. If a proportion of the used amounts of the electron donor (a) and the electron donor (b) is out of the ranges, the magnesium compound is less liable to be dissolved in a certain case. Also, the electron donor (a), the electron donor (b) and the electron donor (B) are preferably hetero atom-containing compounds excluding cyclic ether compounds.

A solvent-soluble magnesium compound is advantageously used in order to obtain catalyst particles having an excellent particle property. On the other hand, the electron donor (a) is preferably used, as described above, in order to obtain the highly active solid titanium catalyst component (I) for ethylene polymerization. In the present invention, even if the electron donor (a) and the electron donor (b) are used in combination, the solid titanium catalyst component (I) for ethylene polymerization having an excellent particle property can be obtained, to be surprised, without damaging an effect of showing the high activity in the ethylene polymerization.

The liquid magnesium compound (A) is preferably prepared in a liquid hydrocarbon medium. Magnesium in the liquid hydrocarbon medium is used in a concentration of 0.1 to 20 mol/liter, preferably 0.5 to 5 mol/liter. The liquid hydrocarbon media include publicly known hydrocarbon compounds such as heptane, octane and decane as the preferred examples.

Electron Donor (B):

Electron donors used for preparing solid titanium catalyst components for polymerization of α-olefins described in Japanese Patent Application Laid-Open No. 83006/1983 and Japanese Patent Application Laid-Open No. 811/1981 can be listed as the preferred examples of the electron donor (B) used for preparing the solid titanium catalyst component (I) for ethylene polymerization according to the present invention.

To be specific, a dicarboxylic ester compound is listed, and to be more specific, a dicarboxylic ester compound having plural carboxylic ester groups and represented by the following Formula (1) is listed. The dicarboxylic ester compound represented by the following Formula (1) is preferably used from the viewpoint that it is excellent in controlling a molecular weight and a molecular weight distribution of the resulting ethylene polymer. In Formula (1), $C^a$ represents a carbon atom.

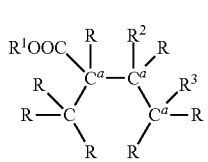

(1)

In Formula (1), $R^2$ and $R^3$ each represent independently $COOR^1$ or R, and at least one of $R^2$ and $R^3$ is $COOR^1$.

All of carbon-carbon bonds in a framework of Formula (1) are preferably single bonds, and any carbon-carbon bond other than a $C^a$-$C^a$ bond in the framework may be substituted with a double bond.

A plurality of $R^1$ each is independently a monovalent hydrocarbon group having 1 to 20 carbon atoms, preferably 1 to 10 carbon atoms, more preferably 1 to 8 carbon atoms and particularly preferably 2 to 3 carbon atoms. The hydrocarbon groups include methyl, ethyl, n-propyl, isopropyl, n-butyl, isobutyl, neopentyl, hexyl, heptyl, octyl, 2-ethylhexyl, decyl, dodecyl, tetradecyl, hexadecyl, octadecyl, eicosyl and the like. It is preferably methyl, ethyl, n-propyl, isopropyl, n-butyl, isobutyl, neopentyl, hexyl, heptyl, octyl, 2-ethylhexyl and decyl, more preferably methyl, ethyl, n-propyl, isopropyl, n-butyl, isobutyl, neopentyl, hexyl, heptyl, octyl and 2-ethylhexyl. Ethyl, n-propyl and isopropyl are particularly preferred.

A plurality of R each is independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group.

Among them, a hydrocarbon group having 1 to 20 carbon atoms is preferred as R other than a hydrogen atom, and a hydrocarbon group having 1 to 10 carbon atoms is more preferred. The hydrocarbon groups include, for example, aliphatic hydrocarbon groups, alicyclic hydrocarbon groups and aromatic hydrocarbon groups such as methyl, ethyl, n-propyl, isopropyl, n-butyl, isobutyl, sec-butyl, n-pentyl, cyclopentyl, n-hexyl, cyclohexyl, vinyl, phenyl and octyl, and they include preferably aliphatic hydrocarbon groups such as methyl, ethyl, n-propyl, isopropyl, n-butyl, isobutyl, sec-butyl and n-pentyl. It is particularly preferably ethyl, n-propyl and isopropyl.

When R is such the group, it is preferred from the viewpoint that not only a solvent-soluble component originating in a low molecular weight described later can be inhibited from being produced but also it is excellent as well in a particle property.

Further, at least two groups of R may be linked together to form a ring, and a double bond and a hetero atom may be contained in a framework of the ring formed by combining R with each other. When two or more $C^a$ to which $COOR^1$ is bonded are contained in the framework of the ring, the number of carbon atoms forming the framework of the ring is 5 to 10.

$R^2$ and $R^3$ which are not $COOR^1$ are preferably a hydrogen atom or a hydrocarbon group.

Among them, preferred are a hydrogen atom, a secondary alkyl group, for example, isopropyl, sec-butyl, 2-pentyl and 3-pentyl or a cycloalkyl group, for example, cyclohexyl, cyclopentyl and cyclohexylmethyl. Among them, at least one of $R^2$ and $R^3$ which are not $COOR^1$ bonded to $C^a$ is preferably a hydrogen atom.

The examples of the dicarboxylic ester compound represented by Formula (1) include diethyl 2,3-bis(2-ethylbutyl) succinate, diethyl 2,3-dibenzylsuccinate, diethyl 2,3-diisopropylsuccinate, diisobutyl 2,3-diisopropylsuccinate, diethyl 2,3-bis(cyclohexylmethyl)succinate, diethyl 2,3-diisobutylsuccinate, diethyl 2,3-dineopentylsuccinate, diethyl 2,3-dicyclopentylsuccinate and diethyl 2,3-dicyclohexylsuccinate in a pure (S, R) (S, R) form or optional racemic mixture. The dicarboxylic ester compounds are preferred from the viewpoint that they are excellent in controlling a molecular weight and a molecular weight distribution of the resulting ethylene polymer.

The other examples include diethyl sec-butylsuccinate, diethyl thexylsuccinate, diethyl cyclopropylsuccinate, diethyl norbornylsuccinate, diethyl (10-)perhydronaphthylsuccinate, diethyl trimethylsilylsuccinate, diethyl methoxysuccinate, diethyl p-methoxyphenylsuccinate, diethyl p-chlorophenylsuccinate, diethyl phenylsuccinate, diethyl cyclohexylsuccinate, diethyl benzylsuccinate, diethyl (cyclohexylmethyl)succinate, diethyl t-butylsuccinate, diethyl isobutylsuccinate, diethylisopropylsuccinate, diethyl neopentylsuccinate, diethyl 2,2-dimethylsuccinate, diethyl 2-ethyl-2-methylsuccinate, diethyl 2-benzyl-2-isopropylsuccinate, diethyl 2-(cyclohexylmethyl)-2-isobutylsuccinate, diethyl 2-cyclopentyl-2-n-propylsuccinate, diethyl 2,2-diisobutylsuccinate, diethyl 2-cyclohexyl-2-ethylsuccinate, diethyl 2-isopropyl-2-methylsuccinate, diethyl 2,2-diisopropylsuccinate, diethyl 2-isobutyl-2-ethylsuccinate, diethyl 2-(1,1,1-trifluoro-2-propyl)-2-methylsuccinate, diethyl 2-isopentyl-2-isobutylsuccinate, diethyl 2-phenyl-2-n-butylsuccinate, diisobutyl 2,2-dimethylsuccinate, diisobutyl 2-ethyl-2-methylsuccinate, diisobutyl 2-benzyl-2-isopropylsuccinate, diisobutyl 2-(cyclohexylmethyl)-2-isobutylsuccinate, diisobutyl 2-cyclopentyl-2-n-propylsuccinate, diethyl cyclobutane-1,2-dicarboxylate and diethyl 3-methylcyclobutane-1,2-dicarboxylate.

The suitable examples of the compound having a ring structure formed by combining the R groups with each other in Formula (1) include a compound represented by the following Formula (2). In the following Formula (2), $C^a$ and $C^b$ represent a carbon atom.

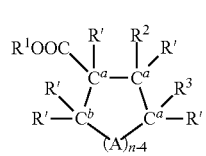

(2)

In Formula (2), n is an integer of 5 to 10, preferably an integer of 5 to 8, more preferably an integer of 5 to 7 and most preferably 6.

$R^2$ and $R^3$ each are independently $COOR^1$ or R', and at least one of $R^2$ and $R^3$ is $COOR^1$. $R^2$ is preferably $COOR^1$, and $R^3$ is preferably R'.

All of carbon-carbon bonds in a cyclic framework are preferably single bonds, and in the cyclic framework any carbon-carbon bond other than a $C^a$-$C^a$ bond an a $C^a$-$C^b$ bond when $R^3$ is a hydrogen atom may be substituted with a double bond.

A plurality of $R^1$ is a hydrocarbon group having 1 to 20 carbon atoms as is the case with $R^1$ in Formula (1), preferably a hydrocarbon group having 1 to 8 carbon atoms and more preferably a hydrocarbon group having 2 to 3 carbon atoms. The suitable examples of $R^1$ are methyl, ethyl, n-propyl, isopropyl, n-butyl, isobutyl, neopentyl and 2-ethylhexyl, more preferably ethyl, n-propyl and isopropyl.

In Formula (2), A is:

or a hetero atom excluding an oxygen atom.
A is preferably:

and a ring formed by $C^a$, $C^b$ and A is preferably a cyclic carbon structure, and is particularly preferably a saturated alicyclic structure wherein the cyclic structure is constituted only by carbons.

A plurality of R' each is independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group.

Among them, a hydrocarbon group having 1 to 20 carbon atoms is preferred as R' other than a hydrogen atom, and a hydrocarbon group having 1 to 10 carbon atoms is more preferred. The hydrocarbon groups include, for example, aliphatic hydrocarbon groups, alicyclic hydrocarbon groups and aromatic hydrocarbon groups such as methyl, ethyl, n-propyl, isopropyl, n-butyl, isobutyl, sec-butyl, n-pentyl, cyclopentyl, n-hexyl, cyclohexyl, vinyl, phenyl and octyl, preferably aliphatic hydrocarbon groups such as methyl, ethyl, n-propyl, isopropyl, n-butyl, isobutyl, sec-butyl and n-pentyl, and it is particularly preferably ethyl, n-propyl and isopropyl.

When R' is such the group, it is preferred from the viewpoint that not only a solvent-soluble component originating in a low molecular weight described later can be inhibited from being produced but also it is excellent as well in a particle property.

Further, R' may be linked each other to form a ring, and a double bond and a hetero atom excluding an oxygen atom may be contained in a framework of the ring formed by combining R' with each other. When two or more $C^a$ to which $COOR^1$ is bonded are contained in the framework of the ring, the number of carbon atoms forming the framework of the ring is 5 to 10.

The frameworks of the rings include a norbornane framework, a tetracyclododecane framework and the like.

A plurality of R' may be a carboxylic ester group, an alkoxy group, a siloxy group, a carbonyl structure-containing group such as an aldehyde group and an acetyl group.

R' is preferably a hydrogen atom or a hydrocarbon group.
The dicarboxylic ester compounds represented by the Formula (2) include
diethyl cyclohexane-1,2-dicarboxylate,
di-n-propyl cyclohexane-1,2-dicarboxylate,
diisopropyl cyclohexane-1,2-dicarboxylate,
diethyl cyclohexane-1,3-dicarboxylate,
di-n-propyl cyclohexane-1,3-dicarboxylate,
diisopropyl cyclohexane-1,3-dicarboxylate,
diethyl 3-methylcyclohexane-1,2-dicarboxylate,
di-n-propyl 3-methylcyclohexane-1,2-dicarboxylate,
diisopropyl 3-methylcyclohexane-1,2-dicarboxylate,
diethyl 4-methylcyclohexane-1,3-dicarboxylate,
di-n-propyl 4-methylcyclohexane-1,3-dicarboxylate,
diethyl 4-methylcyclohexane-1,2-dicarboxylate,
di-n-propyl 4-methylcyclohexane-1,2-dicarboxylate,
diisopropyl 4-methylcyclohexane-1,2-dicarboxylate,
diethyl 5-methylcyclohexane-1,3-dicarboxylate,
di-n-propyl 5-methylcyclohexane-1,3-dicarboxylate,
diisopropyl 5-methylcyclohexane-1,3-dicarboxylate,
diethyl 3,4-dimethylcyclohexane-1,2-dicarboxylate,
di-n-propyl 3,4-dimethylcyclohexane-1,2-dicarboxylate,
diisopropyl 3,4-dimethylcyclohexane-1,2-dicarboxylate,
diethyl 3,6-dimethylcyclohexane-1,2-dicarboxylate,
di-n-propyl 3,6-dimethylcyclohexane-1,2-dicarboxylate,
diisopropyl 3,6-dimethylcyclohexane-1,2-dicarboxylate,
diethyl 3-hexylcyclohexane-1,2-dicarboxylate,
di-n-propyl 3-hexylcyclohexane-1,2-dicarboxylate,
di-n-propyl 3,6-dihexylcyclohexane-1,2-dicarboxylate,
diethyl 3-hexyl-6-pentylcyclohexane-1,2-dicarboxylate,
diethyl cyclopentane-1,2-dicarboxylate,
di-n-propyl cyclopentane-1,2-dicarboxylate,
diisopropyl cyclopentane-1,2-dicarboxylate,
diethyl cyclopentane-1,3-dicarboxylate,
di-n-propyl cyclopentane-1,3-dicarboxylate,
diethyl 3-methylcyclopentane-1,2-dicarboxylate,
di-n-propyl 3-methylcyclopentane-1,2-dicarboxylate,
diisopropyl 3-methylcyclopentane-1,2-dicarboxylate,
diethyl 4-methylcyclopentane-1,3-dicarboxylate,
di-n-propyl 4-methylcyclopentane-1,3-dicarboxylate,
diisopropyl 4-methylcyclopentane-1,3-dicarboxylate,
diethyl 4-methylcyclopentane-1,2-dicarboxylate,
di-n-propyl 4-methylcyclopentane-1,2-dicarboxylate,
diisopropyl 4-methylcyclopentane-1,2-dicarboxylate,
diethyl 5-methylcyclopentane-1,3-dicarboxylate,
di-n-propyl 5-methylcyclopentane-1,3-dicarboxylate,
diethyl 3,4-dimethylcyclopentane-1,2-dicarboxylate,
di-n-propyl 3,4-dimethylcyclopentane-1,2-dicarboxylate,
diisopropyl 3,4-dimethylcyclopentane-1,2-dicarboxylate,
diethyl 3,5-dimethylcyclopentane-1,2-dicarboxylate,
di-n-propyl 3,5-dimethylcyclopentane-1,2-dicarboxylate,
diisopropyl 3,5-dimethylcyclopentane-1,2-dicarboxylate,
diethyl 3-hexylcyclopentane-1,2-dicarboxylate,
diethyl 3,5-dihexylcyclopentane-1,2-dicarboxylate,
diethyl cycloheptane-1,2-dicarboxylate,
di-n-propyl cycloheptane-1,2-dicarboxylate,
diisopropyl cycloheptane-1,2-dicarboxylate,
diethyl cycloheptane-1,3-dicarboxylate,
di-n-propyl cycloheptane-1,3-dicarboxylate,
diethyl 3-methylcycloheptane-1,2-dicarboxylate,
di-n-propyl 3-methylcycloheptane-1,2-dicarboxylate,
diisopropyl 3-methylcycloheptane-1,2-dicarboxylate,
diethyl 4-methylcycloheptane-1,3-dicarboxylate,
diethyl 4-methylcycloheptane-1,2-dicarboxylate, di-n-propyl 4-methylcycloheptane-1,2-dicarboxylate,
diisopropyl 4-methylcycloheptane-1,2-dicarboxylate,
diethyl 5-methylcycloheptane-1,3-dicarboxylate,
diethyl 3,4-dimethylcycloheptane-1,2-dicarboxylate,
di-n-propyl 3,4-dimethylcycloheptane-1,2-dicarboxylate,
diisopropyl 3,4-dimethylcycloheptane-1,2-dicarboxylate,
diethyl 3,7-dimethylcycloheptane-1,2-dicarboxylate,
di-n-propyl 3,7-dimethylcycloheptane-1,2-dicarboxylate,
diisopropyl 3,7-dimethylcycloheptane-1,2-dicarboxylate,
diethyl 3-hexylcycloheptane-1,2-dicarboxylate,
diethyl 3,7-dihexylcycloheptane-1,2-dicarboxylate,
diethyl cyclooctane-1,2-dicarboxylate,
diethyl 3-methylcyclooctane-1,2-dicarboxylate,
diethyl cyclodecane-1,2-dicarboxylate,
diethyl 3-methylcyclodecane-1,2-dicarboxylate,
diethyl cyclooxypentane-3,4-dicarboxylate,
diethyl 3,6-dicyclohexylcyclohexane-1,2-dicarboxylate and the like.

Isomers such as cis and trans compounds are present in the compounds having a diester structure, and the compounds having either structure have effects which meet the objects of the present invention in many cases.

Among the compounds, the cyclohexanedicarboxylic esters in which n is 6 in Formula (2) are particularly preferred. The reason therefor resides not only in the catalyst performances thereof but also in that the compounds can be produced at relatively lower costs by making use of a Diels Alder reaction.

Further, when the cyclohexanedicarboxylic esters are used, the catalysts are excellent in a hydrogen response and maintain a high activity, and polymers which are excellent in a particle property can be obtained.

Also, acid halides, acid amides, nitriles, acid anhydrides, organic acid esters and polyethers each shown below can also be used as the electron donor (B).

To be specific, they include acid halides having 2 to 15 carbon atoms such as acetyl chloride, benzoyl chloride, toluyl chloride and anisyl chloride;
acid amides such as N,N-dimethylacetamide, N,N-diethylbenzamide and N,N-dimethyltoluamide;
nitriles such as acetonitrile, benzonitrile and trinitrile;
acid anhydrides such as acetic anhydride, phthalic anhydride and benzoic anhydride;
organic acid esters having 2 to 18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyllactone, δ-valerolactone, coumarin, phthalide and ethyl carbonate. Among the organic acid esters, benzoic acid esters such as methyl benzoate, ethyl benzoate, propyl benzoate, butyl benzoate, octyl benzoate, cyclohexyl benzoate, phenyl benzoate, benzyl benzoate, ethyl ethylbenzoate and ethyl ethoxybenzoate are preferably used in terms of prices, a safety and an availability.

Further, publicly known polyhydric carboxylic esters can be listed. The polyhydric carboxylic esters include, to be specific, aliphatic polycarboxylic esters such as diethyl succinate, dibutyl succinate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, di-2-ethylhexyl fumarate, diethyl itaconate and dioctyl citraconate, aromatic polycarboxylic esters such as phthalates, naphthalenedicarboxylates, triethyl trimellitate and dibutyl trimellitate; heterocyclic polycarboxylic esters such as 3,4-furandicarboxylates. However, among the compounds, the multifunctional aromatic compounds are preferably prevented from being used or used only in a minimum necessary amount in a certain case because of the reasons of safety and health and the like.

Also, other examples of the polyhydric carboxylic esters include esters of long chain dicarboxylic acids, such as diethyl adipate, diisobutyl adipate, diisopropyl sebacate, di-n-butyl sebacate, di-n-octyl sebacate and di-2-ethylhexyl sebacate.

The specific examples of the electron donor (B) include the polyethers, that is, compounds (hereinafter referred to as "polyethers") having two or more ether bonds which are present via plural atoms. Compounds in which carbon, silicon, oxygen, nitrogen, sulfur, phosphorus, boron or two or more atoms selected from them are present between ether bonds can be listed as the polyethers. Among them, preferred are the compounds in which a relatively bulky substituent is bonded to an atom present between ether bonds and in which plural carbon atoms are included in atoms present between two or more ether bonds. For example, a diether compound represented by the following Formula (3) is preferred:

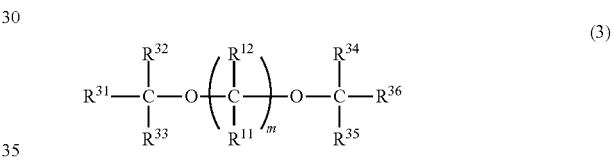

(3)

In Formula (3), m is an integer of 1 to 10, more preferably 3 to 10 and particularly preferably 3 to 5. $R^{11}$, $R^{12}$ and $R^{31}$ to $R^{36}$ each are independently a hydrogen atom or a substituent having at least one element selected from carbon, hydrogen, oxygen, fluorine, chlorine, bromine, iodine, nitrogen, sulfur, phosphorus, boron and silicon.

$R^{11}$ and $R^{12}$ are preferably a hydrocarbon group having 1 to 10 carbon atoms, more preferably a hydrocarbon group having 2 to 6 carbon atoms, and $R^{31}$ to $R^{36}$ are preferably a hydrogen atom or a hydrocarbon group having 1 to 6 carbon atoms.

$R^{11}$ and $R^{12}$ are, to be specific, methyl, ethyl, n-propyl, isopropyl, n-butyl, isobutyl, isopentyl, neopentyl, hexyl, heptyl, octyl, 2-ethylheptyl, decyl, cyclopentyl and cyclohexyl, and they are preferably ethyl, n-propyl, isopropyl, n-butyl and isobutyl.

$R^{31}$ to $R^{36}$ include, to be specific, a hydrogen atom, methyl, ethyl, n-propyl, isopropyl, n-butyl and isobutyl, and they are preferably a hydrogen atom and methyl.

Any ones of $R^{11}$, $R^{12}$ and $R^{31}$ to $R^{36}$, preferably $R^{11}$ and $R^{12}$ may be linked each other to form a ring other than a benzene ring, and atoms other than carbon may be contained in a main chain.

The specific examples of the compound having two or more ether bonds include
2,2-dicyclohexyl-1,3-dimethoxypropane,
2,2-diethyl-1,3-dimethoxypropane,
2,2-dipropyl-1,3-dimethoxypropane,
2,2-dibutyl-1,3-dimethoxypropane,
2-methyl-2-propyl-1,3-dimethoxypropane,
2-methyl-2-ethyl-1,3-dimethoxypropane, 2-methyl-2-isopropyl-1,3-dimethoxypropane,
2-methyl-2-cyclohexyl-1,3-dimethoxypropane,
2,2-bis(2-cyclohexylethyl)-1,3-dimethoxypropane,
2-methyl-2-isobutyl-1,3-dimethoxypropane,
2-methyl-2-(2-ethylhexyl)-1,3-dimethoxypropane,
2,2-diisobutyl-1,3-dimethoxypropane,
2,2-bis(cyclohexylmethyl)-1,3-dimethoxypropane,
2,2-diisobutyl-1,3-diethoxypropane,
2,2-diisobutyl-1,3-dibuthoxypropane,
2-isobutyl-2-isopropyl-1,3-dimethoxypropane,
2,2-di-s-butyl-1,3-dimethoxypropane,
2,2-di-t-butyl-1,3-dimethoxypropane,
2,2-dineopentyl-1,3-dimethoxypropane,
2-isopropyl-2-isopentyl-1,3-dimethoxypropane,
2-cyclohexyl-2-cyclohexylmethyl-1,3-dimethoxypropane,
2,3-dicyclohexyl-1,4-diethoxybutane,
2,3-diisopropyl-1,4-diethoxybutane,
2,4-diisopropyl-1,5-dimethoxypentane,
2,4-diisobutyl-1,5-dimethoxypentane,
2,4-diisoamyl-1,5-dimethoxypentane,
3-methoxymethyltetrahydrofuran,
3-methoxymethyldioxane,
1,2-diisobutoxypropane,
1,2-diisobutoxyethane,
1,3-diisoamyloxyethane,
1,3-diisoamyloxypropane,
1,3-diisoneopentyloxyethane,
1,3-dineopentyloxypropane,
2,2-tetramethylene-1,3-dimethoxypropane,
2,2-pentamethylene-1,3-dimethoxypropane,
2,2-hexamethylene-1,3-dimethoxypropane,
1,2-bis(methoxymethyl)cyclohexane,
2-cyclohexyl-2-ethoxymethyl-1,3-diethoxypropane,
2-cyclohexyl-2-methoxymethyl-1,3-dimethoxypropane,
2,2-diisobutyl-1,3-dimethoxycyclohexane,
2-isopropyl-2-isoamyl-1,3-dimethoxycyclohexane,
2-cyclohexyl-2-methoxymethyl-1,3-dimethoxycyclohexane,
2-isopropyl-2-methoxymethyl-1,3-dimethoxycyclohexane,
2-isobutyl-2-methoxymethyl-1,3-dimethoxycyclohexane,
2-cyclohexyl-2-ethoxymethyl-1,3-diethoxycyclohexane,
2-cyclohexyl-2-ethoxymethyl-1,3-dimethoxycyclohexane,
2-isopropyl-2-ethoxymethyl-1,3-diethoxycyclohexane,
2-isopropyl-2-ethoxymethyl-1,3-dimethoxycyclohexane,
2-isobutyl-2-ethoxymethyl-1,3-diethoxycyclohexane and
2-isobutyl-2-ethoxymethyl-1,3-dimethoxycyclohexane.

Among them, 1,3-diethers are preferred, and particularly preferred are 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)-1,3-dimethoxypropane.

Further, an alkoxysilane compound represented by a formula $R_nSi(OR')_{4-n}$ described later and tetraalkoxysilane compounds such as tetraethoxysilane and tetrabutoxysilane can be shown as the examples of the electron donor (B).

The compounds listed as the electron donor (B) may be used alone or two or more kinds of the compounds may be used in combination.

Among them, the dicarboxylic esters having the cyclic structure represented by Formula (2) or mixtures of the organic acid esters with the diether compound represented by Formula (3) are particularly preferred.

Among the preferred electron donors (B), the dicarboxylic esters or the organic acid esters may be formed in a step for preparing the solid titanium catalyst component (I) for ethylene polymerization. They can be formed as well, for example, in a step for bringing them into contact with the magnesium compound (A). To be more specific, the electron donor (B) can be incorporated into the solid titanium catalyst component by providing a step in which carboxylic anhydride corresponding to the compound and alcohol corresponding to the carboxylic halide are substantially brought into contact therewith in bringing them into contact with the magnesium compound (A).

According to investigations of the present inventors, it can be found that if the electron donor (B) is used, the solvent-soluble component tends to be less by-produced, as shown in FIG. 1, when the polymers having a similar intrinsic viscosity [η], that is, a similar molecular weight are compared. Also, if the electron donor (B) is used, the solid titanium catalyst component having a good particle property tends to be readily obtained.

Liquid Titanium Compound (C):

The liquid titanium compound (C) used for preparing the solid titanium catalyst component (I) for ethylene polymerization according to the present invention may be titanium compounds described in JP 1983-83006 and JP 1981-811. A tetravalent titanium compound represented by the following Formula (4) can be listed as the specific example of the liquid titanium compound (C):

$$Ti(OR)_gX_{4-g} \qquad (4)$$

wherein R is an aliphatic hydrocarbon group having 1 to 5 carbon atoms; X is a halogen atom; and g shows $0 \leq g \leq 4$.

The specific examples of the tetravalent titanium compounds represented by Formula (4) include titanium tetrahalides such as $TiCl_4$ and $TiBr_4$; alkoxytitanium trihalides such as $Ti(OCH_3)Cl_3$, $Ti(OC_2H_5)Cl_3$, $Ti(O-n-C_4H_9)Cl_3$, $Ti(OC_2H_5)Br_3$ and $Ti(O-iso-C_4H_9)Br_3$; alkoxytitanium dihalides such as $Ti(OCH_3)_2Cl_2$ and $Ti(OC_2H_5)_2Cl_2$; alkoxytitanium monohalides such as $Ti(OCH_3)_3Cl$, $Ti(O-n-C_4H_9)_3Cl$ and $Ti(OC_2H_5)_3Br$; and tetraalkoxytitaniums such as $Ti(OCH_3)_4$, $Ti(OC_2H_5)_4$, $Ti(OC_4H_9)_4$ and $Ti(O-2-ethylhexyl)_4$.

Among them, the titanium tetrahalides are preferred, and titanium tetrachloride is particularly preferred. The titanium compounds may be used alone or in combination of two or more kinds thereof.

In the present invention, it is preferable that at least one of the liquid magnesium compound (A) and the liquid titanium compound (C) contains halogen.

When both of the liquid magnesium compound (A) and the titanium compound (C) do not contain halogen, they can be brought into contact with a publicly known halogen-containing compound such as halogen-containing silicon compounds in an optional step. Representative examples of the halogen-containing compounds include silicon tetrachloride.

Preparation of Solid Titanium Catalyst Component (I) for Ethylene Polymerization The solid titanium catalyst component (I) for ethylene polymerization according to the present invention is obtained by bringing the liquid magnesium compound (A) into contact with the liquid titanium compound (C) under the presence of the electron donor (B). In this case, the liquid magnesium compound (A) may be in a state in which it is dissolved in a publicly known liquid hydrocarbon medium, for example, heptane, octane and decane.

If the liquid magnesium compound (A) and the liquid titanium compound (C) are brought into contact with the electron donor (B) after completely finishing contact of the liquid magnesium compound (A) with the liquid titanium compound (C), amorphous particles and fine particles tend to be formed. In this case, the refining step carried out by filtration and decantation is deteriorated, and the polymer obtained by using the solid titanium catalyst component is inferior in particle properties. Thus, problems such as a reduction in the productivity and the handling property are brought about in a certain case.

As long as these requisites are satisfied, a publicly known method comprising bringing the liquid magnesium compound (A), the electron donor (B) and the liquid titanium compound (C) into contact with one another to obtain a solid titanium catalyst component can be used without any limitations. For example, the following methods (P-1) to (P-5) can be listed.

(P-1): a method comprising bringing a mixture of the liquid magnesium compound (A) and the electron donor (B) into contact with the liquid titanium compound (C) to deposit a solid titanium complex.

(P-2): a method comprising reacting a mixture of the liquid magnesium compound (A) and the electron donor (B) with the liquid titanium compound (C), and further bringing it into contact with the liquid titanium compound (C) in several batches to deposit a solid titanium complex.

(P-3): a method comprising bringing the liquid magnesium compound (A), the electron donor (B) and the liquid titanium compound (C) into contact at the same time to deposit a solid titanium complex. In this case, the electron donor (B) may be, if necessary, brought into contact in an optional step.

(P-4): a method comprising bringing a mixture of the liquid magnesium compound (A) and the electron donor (B) into contact with the liquid titanium compound (C), and further bringing it into contact with the electron donor (B) to deposit a solid titanium complex. In this case, the liquid titanium compound (C) may be brought into contact in several batches.

(P-5): a method comprising bringing the liquid magnesium compound (A) into contact with a mixture of the electron donor (B) and the liquid titanium compound (C) to deposit a solid titanium complex. In this case, the electron donor (B) may be, if necessary, brought into contact in an optional step, and the liquid titanium compound (C) may be brought into contact in several batches.

As described above, the electron donor (B) may be brought into contact again after finishing bringing the liquid magnesium compound (A) into contact with the liquid titanium compound (C).

According to the method in which the liquid obtained by mixing in advance the liquid magnesium compound (A) with the electron donor (B) is used among the methods, the resulting solid titanium catalyst component is provided with good particle properties (amorphous particles and fine particles are less liable to be produced), and the refining step carried out by filtration and decantation favorably proceeds, so that it is preferred in terms of the productivity and the handling property.

In the present invention, the electron donor (B) is used in an amount falling in the range of preferably 0.005 to 5 mol, more preferably 0.01 to 2 mol and particularly preferably 0.03 to 1 mol based on 1 mol of the liquid magnesium compound (A). However, the preferred ranges are varied in a certain case according to the liquid titanium compound (C) usage.

In the present invention, the liquid titanium compound (C) is used in an amount falling in the range of preferably 0.1 to 100 mol, more preferably 0.5 to 80 mol, further preferably 1 to 70 mol and particularly preferably 5 to 70 mol based on 1 mol of the liquid magnesium compound (A).

Halogen/titanium (atomic ratio) contained in the solid titanium catalyst component (I) for ethylene polymerization according to the present invention is 2 to 100, preferably 4 to 90, and magnesium/titanium (atomic ratio) is 1 to 100, preferably 1 to 50.

A molar ratio between the electron donor (B), the electron donor (a) or the electron donor (b), and a titanium atom each contained in the solid titanium catalyst component (I) for ethylene polymerization according to the present invention is 0 to 100, preferably 0.01 to 10 and more preferably 0.2 to 10.

<Ethylene Polymerization Catalyst>

The ethylene polymerization catalyst according to the present invention comprises the solid titanium catalyst component (I) for ethylene polymerization obtained in the manner described above and the organic metal compound catalyst component (II). The above organic metal compound catalyst component (II) is preferably an organic metal compound containing metal selected from a 1st group, a 2nd group and a 13th group in the periodic table, and capable of being used are, for example, organic aluminum compounds, alkyl complexes of 1st group metals with aluminum and organic metal compounds of 2nd group metal such as Grignard reagents and organic magnesium compounds. Among them, the organic aluminum compounds are preferred.

Organic Metal Compound Catalyst Component (II):

Preferred examples of the organic metal compound catalyst component (II) include organic metal compound catalyst components described in publicly known documents such as EP585869A1. They are particularly preferably organic aluminum compounds such as triethylaluminum, tributylaluminum, triisobutylaluminum, trioctylaluminum and diethylaluminum hydride.

Electron Donor (III):

The ethylene polymerization catalyst of the present invention can comprise, if necessary, an electron donor (III) in addition to the organic metal compound catalyst component (II). The electron donor (III) is preferably an organic silicon compound. For example, a compound represented by the following Formula (5) can be listed as the organic silicon compound:

$$R_n Si(OR')_{4-n} \quad (5)$$

wherein R and R' are aliphatic, alicyclic or aromatic hydrocarbon groups having 1 to 20 carbon atoms; and n represents 0<n<4.

Used as the organic silicon compound represented by Formula (5) are, to be specific, diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane and cyclopentyldimethylethoxysilane.

Among them, vinyltriethoxysilane, diphenyldimethoxysilane, dicyclohexyldimethoxysilane, cyclohexylmethyldimethoxysilane, dicyclopentyldimethoxysilane and the like are preferably used. The organic silicon compounds can be used in a mixture of two or more kinds thereof.

The compounds shown as the examples of the electron donor (B), the electron donor (a) and the electron donor (b) each used for the solid titanium catalyst component (I) for ethylene polymerization can be listed as the other electron donors (III). Among them, the polyethers can be listed as the preferred examples thereof.

In the present invention, the ethylene polymerization catalyst can comprise, if necessary, other components useful for olefin polymerization, such as antistatic agents, particle flocculants and storage stabilizers in addition to the respective components.

The ethylene polymerization catalyst of the present invention can be used to polymerize α-olefins such as propylene.

<Polymerization Method for Ethylene>

The ethylene polymerization method of the present invention is characterized by polymerizing ethylene alone or olefins containing ethylene with the ethylene polymerization catalyst to obtain an ethylene polymer. That is, ethylene is homopolymerized or copolymerized with other olefins under the presence of the ethylene polymerization catalyst.

In the ethylene polymerization method of the present invention, olefin is prepolymerized under the presence of the ethylene polymerization catalyst of the present invention to obtain a prepolymerization catalyst, and ethylene can be polymerized under the presence of the prepolymerization catalyst. The prepolymerization is carried out by prepolymerizing the olefin in an amount of 0.1 to 1000 g, preferably 0.3 to 500 g and particularly preferably 1 to 200 g per 1 g of the ethylene polymerization catalyst.

In the prepolymerization, the catalyst having a higher concentration than that of the catalyst used in the system in the main polymerization can be used. A concentration of the solid titanium catalyst component (I) for ethylene polymerization in the prepolymerization falls in the range of usually about 0.001 to 200 mmol, preferably about 0.01 to 50 mmol and particularly preferably 0.1 to 20 mmol per 1 liter of the liquid medium in terms of a titanium atom.

The amount of the organic metal compound catalyst component (II) in the prepolymerization is such that 0.1 to 1000 g, preferably 0.3 to 500 g of the polymer per 1 g of the solid titanium catalyst component (I) for ethylene polymerization is produced, and it is preferably an amount of usually about 0.1 to 300 mol, preferably about 0.5 to 100 mol and particularly preferably 1 to 50 mol per 1 mol of a titanium atom contained in the solid titanium catalyst component (I) for ethylene polymerization.

In the prepolymerization, the electron donor (III) and the like can be used if necessary. In this case, these components are used in an amount of 0.1 to 50 mol, preferably 0.5 to 30 mol and more preferably about 1 to 10 mol per 1 mol of a titanium atom contained in the solid titanium catalyst component (I) for ethylene polymerization.

The prepolymerization can be carried out on mild conditions by adding olefin and the catalyst components to an inert hydrocarbon medium.

In the above case, examples of the inert hydrocarbon medium used include aliphatic hydrocarbons such as propane, butane, heptane, octane, decane, dodecane and kerosene; alicyclic hydrocarbons such as cycloheptane and methylcycloheptane; aromatic hydrocarbons such as benzene, toluene and xylene; halogenated hydrocarbon such as ethylene chloride and chlorobenzene, or mixtures thereof.

Among the inert hydrocarbon media, the aliphatic hydrocarbons are particularly preferably used. When the inert hydrocarbon medium is used, the prepolymerization is preferably carried out by a batch system.

On the other hand, the prepolymerization can be carried out by using olefin itself as a solvent, or prepolymerization can be carried out substantially in the absence of the solvent. In this case, the prepolymerization is preferably carried out in a continuous manner.

Publicly known olefins such as ethylene, propylene, 1-butene, 1-pentene, 1-hexene and 4-methyl-1-pentene can be used as the olefin used in the prepolymerization. Among them, ethylene and propylene are preferred.

Temperature in the prepolymerization falls in the range of usually about −20 to +100° C., preferably about −20 to +80° C. and more preferably about 0 to +40° C.

Next, the main polymerization shall be explained.

In the main polymerization, ethylene can be used alone or other olefins can be used in addition to ethylene. Examples of them include α-olefins having 3 to 20 carbon atoms, for example, propylene, 1-butene, 1-pentene, 1-hexene, 4-methyl-1-pentene, 1-octene, 1-decene, 1-dodecene, 1-tetradecene, 1-hexadecene, 1-octadecene and 1-eicosene. Propylene, 1-butene, 1-pentene, 4-methyl-1-pentene, 1-hexene, 1-octene and the like are preferably used. In addition to them, aromatic vinyl compounds such as styrene and allylbenzene and alicyclic vinyl compounds such as vinylcycloheptane can be used. Also, the compounds can be used in combination of two or more kinds thereof. Further, cyclopentene, cycloheptene, compounds having multi-unsaturated bonds such as conjugated dienes and non-conjugated dienes in dienes such as norbornene, tetracylododecene, isoprene and butadiene can be used as polymerization materials together with ethylene and the α-olefins.

In the present invention, the prepolymerization and the main polymerization can be carried out by either of a liquid phase polymerization method such as solution polymerization and slurry polymerization and a gas phase polymerization method. In particular, the main polymerization is carried out preferably by slurry polymerization.

When a reaction mode of slurry polymerization is employed in the main polymerization, the inert hydrocarbon used in the prepolymerization is preferably used as a reaction solvent.

In the main polymerization in the ethylene polymerization method of the present invention, the solid titanium catalyst component (I) for ethylene polymerization is used in an amount of usually about 0.0001 to 0.5 mmol, preferably about 0.005 to 0.1 mmol in terms of a titanium atom per 1 liter of the polymerization volume. Also, the organic metal compound catalyst component (II) is used in an amount of usually about 1 to 2000 mol, preferably about 5 to 500 mol in terms of a metal atom per 1 mol of a titanium atom contained in the prepolymerization catalyst component in the polymerization system. When the electron donor (III) is used, it is used in an amount of 0.001 to 50 mol, preferably 0.01 to 30 mol and particularly preferably 0.05 to 20 mol based on 1 mol of a metal atom of the organic metal compound catalyst component (II).

Use of hydrogen in the main polymerization makes it possible to control a molecular weight of the resulting ethylene polymer, and the ethylene polymer having a large melt flow rate (hereinafter referred to as "MFR") is obtained. If the ethylene polymerization catalyst of the present invention is used, the polymer having higher MFR tends to be readily obtained in a smaller hydrogen amount than in conventional ethylene polymerization catalysts.

The reason why the polymer having higher MFR is liable to be obtained in a smaller hydrogen amount is unknown, but it is considered that chain transfer reaction by hydrogen is expedited by the electron donor (B). In particular, a catalyst comprising the solid titanium catalyst component in which the electron donor represented by Formula (3) is contained tends to show notably the direction.

In the main polymerization in the present invention, the polymerization temperature is set to usually about 20 to 250° C., preferably about 50 to 200° C., and the pressure is set to usually an atmospheric pressure to 10 MPa, preferably about 0.2 to 5 MPa. The temperature in a case of slurry polymerization is about 20 to 100° C., preferably about 50 to 90° C., and the pressure is usually an atmospheric pressure to 1.5 MPa, preferably about 0.2 to 1 MPa. In the polymerization method of the present invention, the polymerization can be carried out by any method of a batch system, a semi-continuous system and a continuous system. Further, the polymerization can be carried out on changed reaction conditions in two or more stages.

The ethylene polymer obtained by the ethylene polymerization method of the present invention is excellent in particle properties and has a high bulk density, and therefore it can be produced at a high productivity. Further, a low molecular weight polymer which is dissolved in an inert hydrocarbon used for slurry polymerization tends to be less by-produced. A by-production amount of the solvent-soluble component is varied according to MFR of the ethylene polymer produced (the higher the MFR is, the higher the amount of the solvent-soluble component tends to be), and the solvent-soluble component formed in producing the polymer having MFR of 300 to 400 g/10 minutes accounts preferably for 8% or less.

It is known that the component having such higher MFR as described above is preferably contained in order to allow a moldability of the ethylene polymer to be compatible with a strength thereof. The ethylene polymerization method of the present invention makes it possible to reduce a loss in producing the ethylene polymer.

EXAMPLES

Next, the present invention shall be specifically explained with reference to examples, but the present invention shall not be restricted to these examples.

In the following examples, a composition, a particle size and a bulk density of the solid titanium catalyst component for ethylene polymerization were measured in the following manners.
(1) Contents of Magnesium and Titanium:
Measured by ICP analysis (ICPF 1000TR, manufactured by Shimadzu Corporation).
(2) Chlorine Content:
Measured by a silver nitrate titration method.
(3) Content of Alcohol Residue:
The catalyst which was sufficiently dried was added to an acetone solution to which 10% by weight of water was added to obtain alcohol by hydrolysis, and the amount of the alcohol residue was quantitatively determined by gas chromatography.
(4) Fine Powder Content (Particle Size Distribution):
A content of fine powders having a particle diameter of less than 75 μm was measured by means of a shaker (Ro-Tap, manufactured by Iida Seisakusho Co., Ltd.) and a sieve (Bunsei Furui, inner diameter: 200 mm, aperture: 75 μm).
(5) Bulk Density (BD):
Measured according to JIS K-6721 standard.
(6) Melt Flow Rate (MFR):
Measured on a condition of 190° C. according to ASTM D1238E.
(7) Solvent-Soluble Component Ratio (SP):
Calculated according to the following equation.

$SP(\%) = 100 \times (\alpha)/((\alpha)+(\beta))$ ($\alpha$): amount of powder-like polymer
($\beta$): amount of ethylene polymer dissolved in a n-heptane solvent An amount of ($\beta$) is measured as a weight of a solid obtained by removing the solvent by distillation from the filtrate separated by filtering after the polymerization.
(8) Intrinsic Viscosity [η]:
The ethylene polymer particles were dissolved in decalin to measure a intrinsic viscosity [η] in decalin of 135° C.

Example 1

Preparation of Solid Titanium Catalyst Component for Ethylene Polymerization 4.76 g (50 mmol) of magnesium chloride anhydrous, 28.1 ml of decane and 16.3 g (125 mmol) of 2-ethylhexyl alcohol (EHA) were reacted by heating at 130° C. for 3 hours to prepare a homogeneous solution, and then 0.94 g (20 mmol) of ethyl alcohol (EtOH) was added and reacted by heating at 50° C. for 1 hour. 0.96 g (3.75 mmol) of diisopropyl cis-cyclohexane-1,2-dicarboxylate was added to the solution and mixed by stirring at 50° C. for further 1 hour, and then the solution was gradually cooled down to room temperature.

A whole amount of the homogeneous solution thus obtained was dropwise added to 200 ml (1.8 mol) of titanium tetrachloride of 0° C. in 1 hour under stirring. The temperature was maintained at 0° C. during dropwise adding. After finishing addition, the mixed solution was maintained at a temperature of 0° C. for 1 hour, and then the temperature was elevated up to 110° C. in 1 hour and 45 minutes. Thereafter, the solution was maintained at the temperature for 30 minutes under stirring and then filtrated at the same temperature to separate a solid part. This solid part was sufficiently washed with decane of 110° C. and then with hexane of room temperature until the free titanium compound was not detected to obtain a solid titanium catalyst component (I-1) for ethylene polymerization. The solid titanium catalyst component thus obtained was stored in the form of a decane suspension, and a part thereof was dried for analysis. The composition thereof was such that 7.0% by weight of titanium, 14% by weight of magnesium, 59% by weight of chlorine, 0.9% by weight of an ethyl alcohol residue and 6.9% by weight of a 2-ethylhexyl alcohol residue.

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-1) for ethylene polymerization obtained above in an amount corresponding to 0.005 mmol in terms of a titanium atom. Then, the temperature was elevated up to 80° C., and hydrogen was supplied at 0.3 MPa, followed by continuously supplying ethylene for 1.5 hour so that the gauge pressure was 0.6 MPa. The polymerization temperature was maintained at 80° C.

After finishing the polymerization, an ethylene polymer was separated from the n-heptane solvent by filtration, washed and dried. After drying, 133.4 g of a powder-like polymer was obtained. This powder-like polymer had MFR of 1.0 g/10 minutes and an apparent bulk density of 0.31 g/ml.

Example 2

Polymerization

Ethylene was polymerized in the same manner as in Example 1, except that the solid titanium catalyst component (I-1) for ethylene polymerization was added in an amount corresponding to 0.015 mmol in terms of a titanium atom, and then the temperature was elevated up to 80° C.; hydrogen was supplied at 0.55 MPa, and then ethylene was continuously supplied for 1.5 hour so that the gauge pressure was 0.6 MPa. The results thereof are shown in Table 1.

Example 3

Polymerization

Ethylene was polymerized in the same manner as in Example 1, except that the solid titanium catalyst component (I-1) for ethylene polymerization was added in an amount corresponding to 0.015 mmol in terms of a titanium atom, and then the temperature was elevated up to 80° C.; hydrogen was supplied at 0.58 MPa, and then ethylene was continuously supplied for 1.5 hour so that the whole pressure was 0.6 MPa. The results thereof are shown in Table 1.

Example 4

Preparation of Solid Titanium Catalyst Component for Ethylene Polymerization

A solid titanium catalyst component (I-2) for ethylene polymerization was obtained in the same manner as in Example 1, except that the temperature reached in heating was changed from 110° C. to 100° C. The composition thereof was such that 7.3% by weight of titanium, 14% by weight of magnesium, 58% by weight of chlorine, 1.1% by weight of an ethyl alcohol residue and 9% by weight of a 2-ethylhexyl alcohol residue.

Polymerization

Ethylene was polymerized in the same manner as in Example 1, except that the solid titanium catalyst component (I-2) for ethylene polymerization was used. The results thereof are shown in Table 1.

Example 5

Preparation of Solid Titanium Catalyst Component for Ethylene Polymerization

A solid titanium catalyst component (I-3) for ethylene polymerization was obtained in the same manner as in Example 1, except that the maintaining time at 110° C. was changed from 30 minutes to 15 minutes. The composition thereof was such that 7.1% by weight of titanium, 14% by weight of magnesium, 57% by weight of chlorine, 1.0% by weight of an ethyl alcohol residue and 7.9% by weight of a 2-ethylhexyl alcohol residue.

Polymerization

Ethylene was polymerized in the same manner as in Example 1, except that the solid titanium catalyst component (I-3) for ethylene polymerization was used. The results thereof are shown in Table 1.

Example 6

Preparation of Solid Titanium Catalyst Component for Ethylene Polymerization

A solid titanium catalyst component (I-4) for ethylene polymerization was obtained in the same manner as in Example 1, except that an amount of ethyl alcohol was changed from 0.94 g to 1.18 g and that the maintaining time at 110° C. was changed from 30 minutes to 120 minutes. The composition thereof was such that 6.7% by weight of titanium, 15% by weight of magnesium, 58% by weight of chlorine, 0.6% by weight of an ethyl alcohol residue and 2.8% by weight of a 2-ethylhexyl alcohol residue.

Polymerization

Ethylene was polymerized in the same manner as in Example 1, except that the solid titanium catalyst component (I-4) for ethylene polymerization was used. The results thereof are shown in Table 1.

Example 7

Preparation of Solid Titanium Catalyst Component for Ethylene Polymerization

A solid titanium catalyst component (I-5) for ethylene polymerization was obtained in the same manner as in Example 1, except that an amount of 2-ethylhexyl alcohol was changed from 16.3 g to 19.5 g; an amount of ethyl alcohol was changed from 0.94 g to 1.88 g; and the maintaining time at 110° C. was changed from 30 minutes to 60 minutes. The composition thereof was such that 7.0% by weight of titanium, 14% by weight of magnesium, 57% by weight of chlorine, 1.1% by weight of an ethyl alcohol residue and 5.1% by weight of a 2-ethylhexyl alcohol residue.

Polymerization

Ethylene was polymerized in the same manner as in Example 1, except that the solid titanium catalyst component (I-5) for ethylene polymerization was used. The results thereof are shown in Table 1.

Example 8

Preparation of Solid Titanium Catalyst Component for Ethylene Polymerization

A solid titanium catalyst component (I-6) for ethylene polymerization was obtained in the same manner as in Example 7, except that diisopropyl cis-cyclohexane-1,2-dicarboxylate was changed to diisopropyl trans-cyclohexane-1,2-dicarboxylate. The composition thereof was such that 7.4% by weight of titanium, 14% by weight of magnesium, 57% by weight of chlorine, 1.8% by weight of an ethyl alcohol residue and 7.7% by weight of a 2-ethylhexyl alcohol residue.

Polymerization

Ethylene was polymerized in the same manner as in Example 1, except that the solid titanium catalyst component (I-6) for ethylene polymerization was used. The results thereof are shown in Table 1.

Example 9

Preparation of Solid Titanium Catalyst Component for Ethylene Polymerization

A solid titanium catalyst component (I-7) for ethylene polymerization was obtained in the same manner as in Example 1, except that an amount of 2-ethylhexyl alcohol was changed from 16.3 g to 19.5 g; an amount of ethyl alcohol was changed from 0.94 g to 2.35 g; and the maintaining time at 110° C. was changed from 30 minutes to 60 minutes. The composition thereof was such that 7.0% by weight of titanium, 15% by weight of magnesium, 58% by weight of chlorine, 1.2% by weight of an ethyl alcohol residue and 4.5% by weight of a 2-ethylhexyl alcohol residue.

Polymerization

Ethylene was polymerized in the same manner as in Example 1, except that the solid titanium catalyst component (I-7) for ethylene polymerization was used. The results thereof are shown in Table 1.

Comparative Example 1

Preparation of Solid Titanium Catalyst Component 4.76 g (50 mmol) of magnesium chloride anhydrous, 28.1 ml of decane and 16.3 g (125 mmol) of 2-ethylhexyl alcohol were reacted by heating at 130° C. for 3 hours to prepare a homogeneous solution. Then, 0.96 g (3.75 mmol) of diisopropyl cis-cyclohexane-1,2-dicarboxylate was added to the solution and mixed by stirring at 50° C. for further 1 hour, and then the solution was gradually cooled down to room temperature.

A whole amount of the homogeneous solution thus obtained was dropwise added to 200 ml (1.8 mol) of titanium tetrachloride of 0° C. in 1 hour under stirring. The temperature was maintained at 0° C. during dropwise adding. After finishing addition, the mixed solution was maintained at a temperature of 0° C. for 1 hour, and then the temperature was elevated up to 110° C. in 1 hour and 45 minutes. Thereafter, the solution was maintained at the temperature for 30 minutes under stirring and then filtrated at the same temperature to separate a solid part.

The solid part was sufficiently washed with decane of 110° C. and then with hexane of room temperature until the free titanium compound was not detected to obtain a solid titanium catalyst component (8). The solid titanium catalyst component thus obtained was stored in the form of a decane suspension, and a part thereof was dried for analysis. The composition thereof was such that 6.4% by weight of titanium, 16% by weight of magnesium, 54% by weight of chlorine and 4.0% by weight of a 2-ethylhexyl alcohol residue.

Polymerization

An autoclave having an inner content of 1 liter was charged with 500 ml of refined n-heptane under nitrogen atmosphere, and added thereto were 0.25 mmol of triethylaluminum and a decane suspension of the solid titanium catalyst component (8) obtained above in an amount corresponding to 0.005 mmol in terms of a titanium atom. Then, the temperature was elevated up to 80° C., and hydrogen was supplied at 0.3 MPa, followed by continuously supplying ethylene for 1.5 hour so that the gauge pressure was 0.6 MPa. The polymerization temperature was maintained at 80° C.

After finishing the polymerization, an ethylene polymer was separated from the n-heptane solvent and dried. After drying, 60.3 g of a powder-like polymer was obtained. This powder-like polymer had MFR of 1.7 g/10 minutes and an apparent bulk density of 0.31 g/ml. The results thereof are shown in Table 1.

Comparative Example 2

Preparation of Solid Titanium Catalyst Component 7.14 g (75 mmol) of magnesium chloride anhydrous, 37.5 ml of decane and 29.3 g (225 mmol) of 2-ethylhexyl alcohol were reacted by heating at 130° C. for 2 hours to prepare a homogeneous solution. Then, 3.1 g (15 mmol) of tetraethoxysilane was added to the solution and mixed by stirring at 50° C. for further 2 hours, and then the solution was gradually cooled down to room temperature.

A whole amount of the homogeneous solution thus obtained was dropwise added to 200 ml (1.8 mol) of titanium tetrachloride maintained at 0° C. in 1 hour. After finishing addition, a temperature of the mixed solution was elevated up to 110° C. in 1 hour and 45 minutes. Thereafter, the solution was maintained at the temperature for 2 hours under stirring, and then a solid part was separated at the same temperature. The solid part was sufficiently washed with decane of 110° C. and then with hexane of room temperature until the free titanium compound was not detected to obtain a solid titanium catalyst component (9). The solid titanium catalyst component thus obtained was stored in the form of a decane suspension, and a part thereof was dried for analysis. The composition thereof was such that 8.4% by weight of titanium, 14% by weight of magnesium, 58% by weight of chlorine and 4.3% by weight of a 2-ethylhexyl alcohol residue.

Polymerization

Ethylene was polymerized in the same manner as in Comparative Example 1, except that the solid titanium catalyst component (9) was used. The results thereof are shown in Table 1.

Comparative Example 3

Polymerization

Ethylene was polymerized in the same manner as in Comparative Example 2, except that the solid titanium catalyst component (9) was added in an amount corresponding to 0.015 mmol in terms of a titanium atom; then, the temperature was elevated up to 80° C., and hydrogen was supplied at 0.55 MPa; next, ethylene was continuously supplied for 1.5 hour so that the gauge pressure was 0.6 MPa. The results thereof are shown in Table 1.

Comparative Example 4

Polymerization

Ethylene was polymerized in the same manner as in Comparative Example 2, except that the solid titanium catalyst component (9) was added in an amount corresponding to 0.015 mmol in terms of a titanium atom; then, the temperature was elevated up to 80° C., and hydrogen was supplied at 0.58 MPa; next, ethylene was continuously supplied for 1.5 hour so that the gauge pressure was 0.6 MPa. The results thereof are shown in Table 1.

Example 10

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-1) for ethylene polymerization in an amount corresponding to 0.015 mmol in terms of a titanium atom. Then, the temperature was elevated up to 80° C., and hydrogen was supplied at 0.6 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 151.1 g of a powder-like polymer was obtained. This powder-like polymer had MFR of 37 g/10 minutes. On the other hand, the solvent was removed from the separated liquid phase part by distillation to obtain 4.8 g of a solid matter. The results thereof are shown in Table 2.

Example 11

Polymerization

Ethylene was polymerized in the same manner as in Example 10, except that hydrogen was supplied at 0.75 MPa. The results thereof are shown in Table 2.

Example 12

Polymerization

Ethylene was polymerized in the same manner as in Example 10, except that hydrogen was supplied at 0.76 MPa. The results thereof are shown in Table 2.

Example 13

Polymerization

Ethylene was polymerized in the same manner as in Example 10, except that hydrogen was supplied at 0.77 MPa. The results thereof are shown in Table 2.

Comparative Example 5

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (8) in an amount corresponding to 0.015 mmol in terms of a titanium atom. Then, the temperature was elevated up to 80° C., and hydrogen was supplied at 0.75 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated and dried. After drying, 76.7 g of a powder-like polymer was obtained. This powder-like polymer had MFR of 140 g/10 minutes.

On the other hand, the solvent was removed from the separated liquid phase part by distillation to obtain 4.6 g of a solid matter. The results thereof are shown in Table 2.

Comparative Example 6

Polymerization

Ethylene was polymerized in the same manner as in Comparative Example 5, except that hydrogen was supplied at 0.78 MPa. The results thereof are shown in Table 2.

Comparative Example 7

Polymerization

Ethylene was polymerized in the same manner as in Comparative Example 5, except that hydrogen was supplied at 0.79 MPa. The results thereof are shown in Table 2.

Example 14

Preparation of Solid Titanium Catalyst Component

A solid titanium catalyst component (I-10) was obtained in the same manner as in Example 1, except that ethyl alcohol was changed to 1.2 g (20 mmol) of n-propanol.

Polymerization

Ethylene was polymerized in the same manner as in Example 1, except that the solid titanium catalyst component (I-10) was used. The results thereof are shown in Table 3.

Example 15

Preparation of Solid Titanium Catalyst Component

A solid titanium catalyst component (I-11) was obtained in the same manner as in Example 1, except that ethyl alcohol was changed to 1.2 g (20 mmol) of iso-propanol.

Polymerization

Ethylene was polymerized in the same manner as in Example 1, except that the solid titanium catalyst component (I-11) was used. The results thereof are shown in Table 3.

Example 16

Preparation of Solid Titanium Catalyst Component

A solid titanium catalyst component (I-12) was obtained in the same manner as in Example 1, except that ethyl alcohol was changed to 1.48 g (20 mmol) of n-butanol.

Polymerization

Ethylene was polymerized in the same manner as in Example 1, except that the solid titanium catalyst component (I-12) was used. The results thereof are shown in Table 3.

Example 17

Preparation of Solid Titanium Catalyst Component

A solid titanium catalyst component (I-13) was obtained in the same manner as in Example 1, except that ethyl alcohol was changed to 1.48 g (20 mmol) of iso-butanol.

Polymerization

Ethylene was polymerized in the same manner as in Example 1, except that the solid titanium catalyst component (I-13) was used. The results thereof are shown in Table 3.

Example 18

Preparation of Solid Titanium Catalyst Component

A solid titanium catalyst component (I-14) was obtained in the same manner as in Example 1, except that ethyl alcohol was changed to 1.76 g (20 mmol) of n-pentanol.

Polymerization

Ethylene was polymerized in the same manner as in Example 1, except that the solid titanium catalyst component (I-14) was used. The results thereof are shown in Table 3.

Example 19

Preparation of Solid Titanium Catalyst Component

A solid titanium catalyst component (I-15) was obtained in the same manner as in Example 1, except that diisopropyl cis-cyclohexane-1,2-dicarboxylate was changed to 0.75 g (5 mmol) of ethyl benzoate.

Polymerization

Ethylene was polymerized in the same manner as in Example 1, except that the solid titanium catalyst component (I-15) was used. The results thereof are shown in Table 3.

Example 20

Preparation of Solid Titanium Catalyst Component

A solid titanium catalyst component (I-16) was obtained in the same manner as in Example 1, except that an amount of ethyl alcohol was changed from 0.94 g to 1.38 g (30 mmol) and that diisopropyl cis-cyclohexane-1,2-dicarboxylate was changed to 0.75 g (5 mmol) of ethyl benzoate.

Polymerization

Ethylene was polymerized in the same manner as in Example 1, except that the solid titanium catalyst component (I-16) was used. The results thereof are shown in Table 3.

Example 21

Preparation of Solid Titanium Catalyst Component

A solid titanium catalyst component (I-17) was obtained in the same manner as in Example 1, except that diisopropyl cis-cyclohexane-1,2-dicarboxylate was changed to 1.26 g (6.25 mmol) of 2-isopropyl-2-isobutyl-1,3-dimethoxypropane.

Polymerization

Ethylene was polymerized in the same manner as in Example 1, except that the solid titanium catalyst component (I-17) was used. The results thereof are shown in Table 3.

Example 22

Preparation of Solid Titanium Catalyst Component

A solid titanium catalyst component (I-18) was obtained in the same manner as in Example 1, except that an amount of ethyl alcohol was changed from 0.94 g to 1.38 g (30 mmol) and that diisopropyl cis-cyclohexane-1,2-dicarboxylate was changed to 1.26 g (6.25 mmol) of 2-isopropyl-2-isobutyl-1,3-dimethoxypropane.

Polymerization

Ethylene was polymerized in the same manner as in Example 1, except that the solid titanium catalyst component (I-18) was used. The results thereof are shown in Table 3.

Example 23

Preparation of Solid Titanium Catalyst Component

A solid titanium catalyst component (I-19) was obtained in the same manner as in Example 1, except that diisopropyl cis-cyclohexane-1,2-dicarboxylate was changed to 0.96 g (3.75 mmol) of diisopropyl trans-cyclohexane-1,2-dicarboxylate.

Polymerization

Ethylene was polymerized in the same manner as in Example 1, except that the solid titanium catalyst component (I-19) was used. The results thereof are shown in Table 3.

Example 24

Preparation of Solid Titanium Catalyst Component

A solid titanium catalyst component (I-20) was obtained in the same manner as in Example 1, except that diisopropyl cis-cyclohexane-1,2-dicarboxylate was changed to 0.96 g (3.75 mmol) of di-n-propyl trans-cyclohexane-1,2-dicarboxylate.

Polymerization

Ethylene was polymerized in the same manner as in Example 1, except that the solid titanium catalyst component (I-20) was used. The results thereof are shown in Table 3.

Comparative Example 8

Preparation of Solid Titanium Catalyst Component

A solid titanium catalyst component (21) was obtained in the same manner as in Comparative Example 1, except that diisopropyl cis-cyclohexane-1,2-dicarboxylate was changed to 0.75 g (5 mmol) of ethyl benzoate.

Polymerization

Ethylene was polymerized in the same manner as in Comparative Example 1, except that the solid titanium catalyst component (21) was used. The results thereof are shown in Table 3.

Comparative Example 9

Preparation of Solid Titanium Catalyst Component

A solid titanium catalyst component (22) was obtained in the same manner as in Comparative Example 1, except that diisopropyl cis-cyclohexane-1,2-dicarboxylate was changed to 1.26 g (6.25 mmol) of 2-isopropyl-2-isobutyl-1,3-dimethoxypropane.

Polymerization

Ethylene was polymerized in the same manner as in Comparative Example 1, except that the solid titanium catalyst component (22) was used. The results thereof are shown in Table 3.

Comparative Example 10

Preparation of Solid Titanium Catalyst Component

A solid titanium catalyst component (23) was obtained in the same manner as in Comparative Example 1, except that diisopropyl cis-cyclohexane-1,2-dicarboxylate was changed to 0.96 g (3.75 mmol) of di-n-propyl trans-cyclohexane-1,2-dicarboxylate.

Polymerization

Ethylene was polymerized in the same manner as in Comparative Example 1, except that the solid titanium catalyst component (23) was used. The results thereof are shown in Table 3.

Example 25

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-10) in an amount corresponding to 0.015 mmol in terms of a titanium atom. Then, the temperature was elevated up to 80° C., and hydrogen was supplied at 0.75 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 44.6 g of a powder-like polymer was obtained. This powder-like polymer had MFR of 520 g/10 minutes. On the other hand, the solvent was removed from the separated liquid phase part by distillation to obtain 4.9 g of a solid matter. The results thereof are shown in Table 4.

Example 26

Polymerization

Ethylene was polymerized in the same manner as in Example 25, except that hydrogen was supplied at 0.77 MPa. The results thereof are shown in Table 4.

Example 27

Polymerization

Ethylene was polymerized in the same manner as in Example 25, except that a decane suspension of the solid titanium catalyst component (I-11) was added in an amount corresponding to 0.015 mmol in terms of a titanium atom and that hydrogen was supplied at 0.76 MPa. The results thereof are shown in Table 4.

Example 28

Polymerization

Ethylene was polymerized in the same manner as in Example 27, except that hydrogen was supplied at 0.77 MPa. The results thereof are shown in Table 4.

Example 29

Polymerization

Ethylene was polymerized in the same manner as in Example 25, except that a decane suspension of the solid titanium catalyst component (I-12) was added in an amount corresponding to 0.015 mmol in terms of a titanium atom and that hydrogen was supplied at 0.74 MPa. The results thereof are shown in Table 4.

Example 30

Polymerization

Ethylene was polymerized in the same manner as in Example 29, except that hydrogen was supplied at 0.77 MPa. The results thereof are shown in Table 4.

Example 31

Polymerization

Ethylene was polymerized in the same manner as in Example 25, except that a decane suspension of the solid titanium catalyst component (I-13) was added in an amount corresponding to 0.015 mmol in terms of a titanium atom and that hydrogen was supplied at 0.74 MPa. The results thereof are shown in Table 4.

Example 32

Polymerization

Ethylene was polymerized in the same manner as in Example 31, except that hydrogen was supplied at 0.77 MPa. The results thereof are shown in Table 4.

Example 33

Polymerization

Ethylene was polymerized in the same manner as in Example 25, except that a decane suspension of the solid titanium catalyst component (I-15) was added in an amount corresponding to 0.015 mmol in terms of a titanium atom and that hydrogen was supplied at 0.76 MPa. The results thereof are shown in Table 4.

Example 34

Polymerization

Ethylene was polymerized in the same manner as in Example 33, except that hydrogen was supplied at 0.79 MPa. The results thereof are shown in Table 4.

Example 35

Polymerization

Ethylene was polymerized in the same manner as in Example 25, except that a decane suspension of the solid titanium catalyst component (I-16) was added in an amount corresponding to 0.015 mmol in terms of a titanium atom and that hydrogen was supplied at 0.77 MPa. The results thereof are shown in Table 4.

Example 36

Polymerization

Ethylene was polymerized in the same manner as in Example 35, except that hydrogen was supplied at 0.78 MPa. The results thereof are shown in Table 4.

Example 37

Polymerization

Ethylene was polymerized in the same manner as in Example 25, except that a decane suspension of the solid titanium catalyst component (I-17) was added in an amount corresponding to 0.015 mmol in terms of a titanium atom and that hydrogen was supplied at 0.69 MPa. The results thereof are shown in Table 4.

Example 38

Polymerization

Ethylene was polymerized in the same manner as in Example 37, except that hydrogen was supplied at 0.72 MPa. The results thereof are shown in Table 4.

Example 39

Polymerization

Ethylene was polymerized in the same manner as in Example 25, except that a decane suspension of the solid titanium catalyst component (I-18) was added in an amount corresponding to 0.015 mmol in terms of a titanium atom and that hydrogen was supplied at 0.72 MPa. The results thereof are shown in Table 4.

Example 40

Polymerization

Ethylene was polymerized in the same manner as in Example 39, except that hydrogen was supplied at 0.76 MPa. The results thereof are shown in Table 4.

Comparative Example 11

Polymerization

Ethylene was polymerized in the same manner as in Comparative Example 5, except that a decane suspension of the solid titanium catalyst component (21) was added in an amount corresponding to 0.015 mmol in terms of a titanium atom and that hydrogen was supplied at 0.77 MPa. The results thereof are shown in Table 4.

Comparative Example 12

Polymerization

Ethylene was polymerized in the same manner as in Comparative Example 5, except that a decane suspension of the solid titanium catalyst component (22) was added in an amount corresponding to 0.015 mmol in terms of a titanium atom and that hydrogen was supplied at 0.74 MPa. The results thereof are shown in Table 4.

Comparative Example 13

Polymerization

Ethylene was polymerized in the same manner as in Comparative Example 5, except that hydrogen was supplied at 0.78 MPa. The results thereof are shown in Table 4.

Comparative Example 14

Polymerization

Ethylene was polymerized in the same manner as in Comparative Example 5, except that hydrogen was supplied at 0.79 MPa. The results thereof are shown in Table 4.

Example 41

Preparation of Solid Titanium Catalyst Component

A solid titanium catalyst component (I-24) was obtained in the same manner as in Example 1, except that diisopropyl cis-cyclohexane-1,2-dicarboxylate was changed to 0.38 g (2.5 mmol) of ethyl benzoate and 0.51 g (2.5 mmol) of 2-isopropyl-2-isobutyl-1,3-dimethoxypropane.

Polymerization

Ethylene was polymerized in the same manner as in Example 1, except that the solid titanium catalyst component (I-24) was used. The results thereof are shown in Table 5.

Example 42

Preparation of Solid Titanium Catalyst Component

A solid titanium catalyst component (I-25) was obtained in the same manner as in Example 1, except that diisopropyl cis-cyclohexane-1,2-dicarboxylate was changed to 0.50 g (3.4 mmol) of ethyl benzoate and 0.33 g (1.7 mmol) of 2-isopropyl-2-isobutyl-1,3-dimethoxypropane.

Polymerization

Ethylene was polymerized in the same manner as in Example 1, except that the solid titanium catalyst component (I-25) was used. The results thereof are shown in Table 5.

Example 43

Preparation of Solid Titanium Catalyst Component

A solid titanium catalyst component (I-26) was obtained in the same manner as in Example 1, except that diisopropyl cis-cyclohexane-1,2-dicarboxylate was changed to 0.60 g (4.0 mmol) of ethyl benzoate and 0.20 g (1.0 mmol) of 2-isopropyl-2-isobutyl-1,3-dimethoxypropane.

Polymerization

Ethylene was polymerized in the same manner as in Example 1, except that the solid titanium catalyst component (I-26) was used. The results thereof are shown in Table 5.

Example 44

Preparation of Solid Titanium Catalyst Component

A solid titanium catalyst component (I-27) was obtained in the same manner as in Example 1, except that diisopropyl cis-cyclohexane-1,2-dicarboxylate was changed to 0.64 g (4.3 mmol) of ethyl benzoate and 0.15 g (0.8 mmol) of 2-isopropyl-2-isobutyl-1,3-dimethoxypropane.

Polymerization

Ethylene was polymerized in the same manner as in Example 1, except that the solid titanium catalyst component (I-27) was used. The results thereof are shown in Table 5.

Example 45

Preparation of Solid Titanium Catalyst Component

A solid titanium catalyst component (I-28) was obtained in the same manner as in Example 1, except that diisopropyl cis-cyclohexane-1,2-dicarboxylate was changed to 0.68 g (4.5 mmol) of ethyl benzoate and 0.10 g (0.5 mmol) of 2-isopropyl-2-isobutyl-1,3-dimethoxypropane.

Polymerization

Ethylene was polymerized in the same manner as in Example 1, except that the solid titanium catalyst component (I-28) was used. The results thereof are shown in Table 5.

Example 46

Preparation of Solid Titanium Catalyst Component

A solid titanium catalyst component (I-29) was obtained in the same manner as in Example 1, except that diisopropyl cis-cyclohexane-1,2-dicarboxylate was changed to 0.71 g (4.8 mmol) of ethyl benzoate and 0.05 g (0.3 mmol) of 2-isopropyl-2-isobutyl-1,3-dimethoxypropane.

Polymerization

Ethylene was polymerized in the same manner as in Example 1, except that the solid titanium catalyst component (I-29) was used. The results thereof are shown in Table 5.

Example 47

Preparation of Solid Titanium Catalyst Component

A solid titanium catalyst component (I-30) was obtained in the same manner as in Example 1, except that an amount of ethyl alcohol was changed from 0.94 g to 1.38 g (30 mmol) and that diisopropyl cis-cyclohexane-1,2-dicarboxylate was changed to 0.71 g (4.8 mmol) of ethyl benzoate and 0.05 g (0.3 mmol) of 2-isopropyl-2-isobutyl-1,3-dimethoxypropane.

Polymerization

Ethylene was polymerized in the same manner as in Example 1, except that the solid titanium catalyst component (I-30) was used. The results thereof are shown in Table 5.

Example 48

Preparation of Solid Titanium Catalyst Component

A solid titanium catalyst component (I-31) was obtained in the same manner as in Example 1, except that an amount of ethyl alcohol was changed from 0.94 g to 1.38 g (30 mmol); diisopropyl cis-cyclohexane-1,2-dicarboxylate was changed to 0.68 g (4.5 mmol) of ethyl benzoate and 0.10 g (0.5 mmol) of 2-isopropyl-2-isobutyl-1,3-dimethoxypropane; and the condition of 30 minutes under stirring after elevating the temperature up to 110° C. was shortened to 15 minutes.

Polymerization

Ethylene was polymerized in the same manner as in Example 1, except that the solid titanium catalyst component (I-31) was used. The results thereof are shown in Table 5.

Example 49

Preparation of Solid Titanium Catalyst Component

A solid titanium catalyst component (I-32) was obtained in the same manner as in Example 1, except that an amount of ethyl alcohol was changed from 0.94 g to 1.38 g (30 mmol); diisopropyl cis-cyclohexane-1,2-dicarboxylate was changed to 0.68 g (4.5 mmol) of ethyl benzoate and 0.10 g (0.5 mmol) of 2-isopropyl-2-isobutyl-1,3-dimethoxypropane; and the condition of 30 minutes under stirring after elevating the temperature up to 110° C. was changed to maintaining stirring for 30 minutes after elevating the temperature up to 100° C.

Polymerization

Ethylene was polymerized in the same manner as in Example 1, except that the solid titanium catalyst component (I-32) was used. The results thereof are shown in Table 5.

Example 50

Preparation of Solid Titanium Catalyst Component

A solid titanium catalyst component (I-33) was obtained in the same manner as in Example 1, except that an amount of ethyl alcohol was changed from 0.94 g to 1.38 g (30 mmol); diisopropyl cis-cyclohexane-1,2-dicarboxylate was changed to 0.68 g (4.5 mmol) of ethyl benzoate and 0.10 g (0.5 mmol) of 2-isopropyl-2-isobutyl-1,3-dimethoxypropane; and the condition of 30 minutes under stirring after elevating the temperature up to 110° C. was changed to maintaining stirring for 15 minutes after elevating the temperature up to 100° C.

Polymerization

Ethylene was polymerized in the same manner as in Example 1, except that the solid titanium catalyst component (I-33) was used. The results thereof are shown in Table 5.

Example 51

Preparation of Solid Titanium Catalyst Component

A solid titanium catalyst component (I-34) was obtained in the same manner as in Example 1, except that an amount of ethyl alcohol was changed from 0.94 g to 1.38 g (30 mmol); diisopropyl cis-cyclohexane-1,2-dicarboxylate was changed to 0.68 g (4.5 mmol) of ethyl benzoate and 0.10 g (0.5 mmol) of 2-isopropyl-2-isobutyl-1,3-dimethoxypropane; and the condition of 30 minutes under stirring after elevating the temperature up to 110° C. was changed to maintaining stirring for 15 minutes after elevating the temperature up to 90° C.

Polymerization

Ethylene was polymerized in the same manner as in Example 1, except that the solid titanium catalyst component (I-34) was used. The results thereof are shown in Table 5.

Example 52

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-24) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 53.8 g of a powder-like polymer was obtained. This powder-like polymer had MFR of 950 g/10 minutes. On the other hand, the solvent was removed from the separated liquid phase part by distillation to obtain 5.7 g of a solid matter. The results thereof are shown in Table 6.

Example 53

Polymerization

Ethylene was polymerized in the same manner as in Example 52, except that hydrogen was supplied at 0.74 MPa. The results thereof are shown in Table 6.

Example 54

Polymerization

Ethylene was polymerized in the same manner as in Example 52, except that hydrogen was supplied at 0.72 MPa. The results thereof are shown in Table 6.

Example 55

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-25) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 54.7 g of a powder-like polymer was obtained. This powder-like polymer had MFR of 670 g/10 minutes. On the other hand, the solvent was removed from the separated liquid phase part by distillation to obtain 5.7 g of a solid matter. The results thereof are shown in Table 6.

Example 56

Polymerization

Ethylene was polymerized in the same manner as in Example 55, except that hydrogen was supplied at 0.74 MPa. The results thereof are shown in Table 6.

Example 57

Polymerization

Ethylene was polymerized in the same manner as in Example 55, except that hydrogen was supplied at 0.72 MPa. The results thereof are shown in Table 6.

Example 58

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-26) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 40.1 g of a powder-like polymer was obtained. This powder-like polymer had MFR of 640 g/10 minutes. On the other hand, the solvent was removed from the separated liquid phase part by distillation to obtain 4.8 g of a solid matter. The results thereof are shown in Table 6.

Example 59

Polymerization

Ethylene was polymerized in the same manner as in Example 58, except that hydrogen was supplied at 0.74 MPa. The results thereof are shown in Table 6.

Example 60

Polymerization

Ethylene was polymerized in the same manner as in Example 58, except that hydrogen was supplied at 0.72 MPa. The results thereof are shown in Table 6.

Example 61

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-27) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 51.2 g of a powder-like polymer was obtained. This powder-like polymer had MFR of 950 g/10 minutes. On the other hand, the solvent was removed from the separated liquid phase part by distillation to obtain 5.3 g of a solid matter. The results thereof are shown in Table 6.

Example 62

Polymerization

Ethylene was polymerized in the same manner as in Example 61, except that hydrogen was supplied at 0.74 MPa. The results thereof are shown in Table 6.

Example 63

Polymerization

Ethylene was polymerized in the same manner as in Example 61, except that hydrogen was supplied at 0.72 MPa. The results thereof are shown in Table 6.

Example 64

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-28) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 38.7 g of a powder-like polymer was obtained. This powder-like polymer had MFR of 860 g/10 minutes. On the other hand, the solvent was removed from the separated liquid phase part by distillation to obtain 5.3 g of a solid matter. The results thereof are shown in Table 6.

Example 65

Polymerization

Ethylene was polymerized in the same manner as in Example 64, except that hydrogen was supplied at 0.74 MPa. The results thereof are shown in Table 6.

Example 66

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-29) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 46.5 g of a powder-like polymer was obtained. This powder-like polymer had MFR of 600 g/10 minutes. On the other hand, the solvent was removed from the separated liquid phase part by distillation to obtain 5.6 g of a solid matter. The results thereof are shown in Table 6.

Example 67

Polymerization

Ethylene was polymerized in the same manner as in Example 66, except that hydrogen was supplied at 0.74 MPa. The results thereof are shown in Table 6.

Example 68

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-30) in an amount corresponding to 0.015 mmol in terms of a titanium atom. Then, the temperature was elevated up to 80° C., and hydrogen was supplied at 0.76 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 82.2 g of a powder-like polymer was obtained. This powder-like polymer had MFR of 410 g/10 minutes. On the other hand, the solvent was removed from the separated liquid phase part by distillation to obtain 6.3 g of a solid matter. The results thereof are shown in Table 6.

Example 69

Polymerization

Ethylene was polymerized in the same manner as in Example 68, except that hydrogen was supplied at 0.74 MPa. The results thereof are shown in Table 6.

Example 70

Polymerization

An autoclave having an inner content of 1 liter was charged with 500 ml of refined n-heptane under ethylene atmosphere, and added thereto were 0.25 mmol of triethylaluminum and a decane suspension of the solid titanium catalyst component (I-31) in an amount corresponding to 0.015 mmol in terms of a titanium atom. Then, the temperature was elevated up to 80° C., and hydrogen was supplied at 0.78 MPa, followed by continuously supplying ethylene for 1.5 hour so that the whole pressure was 0.8 MPa. The polymerization temperature was maintained at 80° C.

After finishing the polymerization, the autoclave was depressurized and cooled down to 65° C., and then a white powder formed was separated from the liquid phase part and dried. After drying, 61.3 g of a powder-like polymer was obtained. This powder-like polymer had MFR of 640 g/10 minutes. On the other hand, the solvent was removed from the separated liquid phase part by distillation to obtain 4.6 g of a solid matter. The results thereof are shown in Table 6.

Example 71

Polymerization

Ethylene was polymerized in the same manner as in Example 70, except that hydrogen was supplied at 0.79 MPa. The results thereof are shown in Table 6.

Comparative Example 15

Polymerization

Ethylene was polymerized in the same manner as in Comparative Example 5, except that a decane suspension of the solid titanium catalyst component (9) was added in an amount corresponding to 0.015 mmol in terms of a titanium atom and that hydrogen was supplied at 0.72 MPa. The results thereof are shown in Table 7.

Comparative Example 16

Polymerization

Ethylene was polymerized in the same manner as in Comparative Example 5, except that a decane suspension of the solid titanium catalyst component (9) was added in an amount corresponding to 0.015 mmol in terms of a titanium atom and that hydrogen was supplied at 0.75 MPa. The results thereof are shown in Table 7.

Comparative Example 17

Polymerization

Ethylene was polymerized in the same manner as in Comparative Example 5, except that a decane suspension of the solid titanium catalyst component (9) was added in an amount corresponding to 0.015 mmol in terms of a titanium atom and that hydrogen was supplied at 0.76 MPa. The results thereof are shown in Table 7.

Comparative Example 18

Polymerization

Ethylene was polymerized in the same manner as in Comparative Example 5, except that a decane suspension of the solid titanium catalyst component (9) was added in an amount corresponding to 0.015 mmol in terms of a titanium atom and that hydrogen was supplied at 0.77 MPa. The results thereof are shown in Table 7.

Comparative Example 19

Polymerization

Ethylene was polymerized in the same manner as in Comparative Example 5, except that a decane suspension of the solid titanium catalyst component (9) was added in an amount corresponding to 0.015 mmol in terms of a titanium atom and that hydrogen was supplied at 0.78 MPa. The results thereof are shown in Table 7.

Comparative Example 20

Polymerization

Ethylene was polymerized in the same manner as in Comparative Example 5, except that a decane suspension of the solid titanium catalyst component (9) was added in an amount corresponding to 0.015 mmol in terms of a titanium atom and that hydrogen was supplied at 0.79 MPa. The results thereof are shown in Table 7.

TABLE 1

| | MgCl$_2$-solubilizing agent | | | | Polymerization results | | | | | | | |
|---|---|---|---|---|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B) | Hydrogen MPa | Yield g | Activity kg-PE/ mmol-Ti | Activity kg-PE/ g-catalyst | MFR g/10 min | BD g/ml | Particle size distribution <75 μm weight % | Kind of catalyst |
| Example 1 | 2.5 | EtOH | 0.4 | 0.16 | Diisopropyl cis-cyclohexane-1,2-dicarboxylate | 0.3 | 133.4 | 26.7 | 39.0 | 1.0 | 0.31 | 4.3 | I-1 |
| Example 2 | 2.5 | | 0.4 | 0.16 | | 0.55 | 42.4 | 2.8 | 4.1 | 370 | 0.33 | — | |
| Example 3 | 2.5 | | 0.4 | 0.16 | | 0.58 | 26.9 | 1.8 | 2.6 | 870 | 0.32 | — | |
| Example 4 | 2.5 | | 0.4 | 0.16 | | 0.3 | 115.0 | 23.0 | 35.1 | 1.4 | 0.30 | 3.5 | I-2 |
| Example 5 | 2.5 | | 0.4 | 0.16 | | 0.3 | 108.1 | 21.6 | 32.0 | 2.3 | 0.28 | 3.8 | I-3 |
| Example 6 | 2.5 | | 0.5 | 0.20 | | 0.3 | 88.8 | 17.8 | 24.8 | 1.4 | 0.25 | 12.3 | I-4 |
| Example 7 | 3.0 | | 0.8 | 0.27 | | 0.3 | 106.9 | 21.4 | 31.2 | 1.4 | 0.27 | 3.1 | I-5 |
| Example 8 | 3.0 | | 0.8 | 0.27 | Diisopropyl trans-cyclohexane-1,2-dicarboxylate | 0.3 | 119.0 | 23.8 | 36.8 | 1.6 | 0.26 | 1.8 | I-6 |
| Example 9 | 3.0 | | 1.0 | 0.33 | Diisopropyl cis-cyclohexane-1,2-dicarboxylate | 0.3 | 105.2 | 21.0 | 30.7 | 1.7 | 0.25 | 8.4 | I-7 |
| Comparative Example 1 | 2.5 | — | — | — | Diisopropyl cis-cyclohexane-1,2-dicarboxylate | 0.3 | 60.3 | 12.1 | 16.1 | 1.7 | 0.31 | 16.2 | 8 |
| Comparative Example 2 | 3.0 | — | — | — | Tetraethoxysilane | 0.3 | 121.5 | 24.3 | 42.6 | 3.0 | 0.31 | 3.2 | 9 |
| Comparative Example 3 | 3.0 | — | — | — | | 0.55 | 75.3 | 5.6 | 8.8 | 130 | 0.31 | — | |
| Comparative Example 4 | 3.0 | — | — | — | | 0.58 | 34.5 | 2.3 | 3.6 | 470 | 0.31 | — | |

EHA: 2-ethylhexyl alcohol, EtOH: ethyl alcohol

TABLE 2

| | MgCl$_2$-solubilizing agent | | | | Polymerization results | | | | | | | |
|---|---|---|---|---|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B) | Hydrogen MPa | Yield g | Activity kg-PE/ mmol-Ti | Activity kg-PE/ g-catalyst | MFR g/10 min | [η] dl/g | Solvent-soluble component ratio % | Kind of catalyst |
| Example 10 | 2.5 | EtOH | 0.4 | 0.16 | Diisopropyl cis-cyclohexane-1,2-dicarboxylate | 0.60 | 151.1 | 10.2 | 15.0 | 37 | 0.98 | 3.1 | I-1 |
| Example 11 | 2.5 | | 0.4 | 0.16 | | 0.75 | 71.4 | 5.0 | 7.3 | 265 | 0.66 | 6.2 | |
| Example 12 | 2.5 | | 0.4 | 0.16 | | 0.76 | 68.1 | 4.8 | 7.0 | 340 | 0.63 | 7.4 | |
| Example 13 | 2.5 | | 0.4 | 0.16 | | 0.77 | 53.8 | 3.8 | 5.5 | 400 | 0.61 | 7.9 | |
| Comparative Example 5 | 2.5 | — | — | — | Diisopropyl cis cyclohexane-1,2-dicarboxylate | 0.75 | 76.7 | 5.3 | 9.1 | 140 | 0.75 | 5.7 | 8 |
| Comparative Example 6 | 2.5 | — | — | — | | 0.78 | 49.5 | 3.5 | 5.9 | 270 | 0.66 | 8.0 | |
| Comparative Example 7 | 2.5 | — | — | — | | 0.79 | 42.0 | 3.0 | 5.1 | 320 | 0.63 | 8.9 | |

TABLE 3

| | Contents of electron donors (a) (b) | | | | Polymerization results | | | | | | | |
|---|---|---|---|---|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B) | Hydrogen MPa | Yield g | Activity kg-PE/ mmol-Ti | Activity kg-PE/ g-catalyst | MFR g/10 min | BD g/ml | Particle size distribution <75 μm weight % | Kind of catalyst |
| Example 14 | 2.5 | n-Propanol | 0.4 | 0.16 | Diisopropyl cis-cyclohexane-1,2-dicarboxylate | 0.30 | 98.3 | 19.7 | 27.5 | 1.4 | 0.33 | 2.8 | I-10 |
| Example 15 | 2.5 | iso-Propanol | 0.4 | 0.16 | | 0.30 | 76.1 | 15.2 | 22.9 | 1.5 | 0.32 | 1.4 | I-11 |
| Example 16 | 2.5 | n-Butanol | 0.4 | 0.16 | | 0.30 | 68.2 | 13.6 | 18.5 | 1.7 | 0.32 | 0.6 | I-12 |
| Example 17 | 2.5 | iso-Butanol | 0.4 | 0.16 | | 0.30 | 67.8 | 13.6 | 16.7 | 2.2 | 0.31 | 1.6 | I-13 |

TABLE 3-continued

| | Contents of electron donors (a) (b) | | | | Polymerization results | | | | | | | |
|---|---|---|---|---|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B) | Hydrogen MPa | Yield g | Activity kg-PE/ mmol-Ti | kg-PE/ g-catalyst | MFR g/ 10 min | BD g/ml | Particle size distribution <75 μm weight % | Kind of catalyst |
| Example 18 | 2.5 | n-Pentanol | 0.4 | 0.16 | | 0.30 | 65.8 | 13.2 | 16.2 | 2.4 | 0.31 | 1.4 | I-14 |
| Example 19 | 2.5 | EtOH | 0.4 | 0.16 | Ethyl benzoate | 0.30 | 109.6 | 21.9 | 24.3 | 3.5 | 0.34 | 0.8 | I-15 |
| Example 20 | 2.5 | | 0.6 | 0.24 | | 0.30 | 132.8 | 26.6 | 28.3 | 3.3 | 0.31 | 1.0 | I-16 |
| Example 21 | 2.5 | | 0.4 | 0.16 | 2-Isopropyl-2-isobutyl-1,3-dimethoxy-propane | 0.30 | 124.5 | 24.9 | 26.5 | 3.1 | 0.31 | 4.8 | I-17 |
| Example 22 | 2.5 | | 0.6 | 0.24 | | 0.30 | 134.0 | 26.8 | 31.3 | 4.1 | 0.26 | 13.2 | I-18 |
| Example 23 | 2.5 | | 0.4 | 0.16 | Diisopropyl trans-cyclohexane-1,2-dicarboxylate | 0.30 | 108.1 | 21.6 | 33.0 | 1.6 | 0.27 | 0.4 | I-19 |
| Example 24 | 2.5 | | 0.4 | 0.16 | Di-n-propyl trans-cyclohexane-1,2-dicarboxylate | 0.30 | 84.8 | 17.0 | 18.8 | 1.7 | 0.32 | 4.4 | I-20 |
| Comparative Example 8 | 2.5 | — | — | — | Ethyl benzoate | 0.30 | 34.0 | 6.8 | 6.7 | 2.6 | 0.28 | 8.4 | 21 |
| Comparative Example 9 | 2.5 | — | — | — | 2-Isopropyl-2-isobutyl-1,3-dimethoxy-propane | 0.30 | 53.2 | 10.6 | 11.6 | 0.3 | 9.20 | 5.6 | 22 |
| Comparative Example 10 | 2.5 | — | — | — | Di-n-propyl trans-cyclohexane-1,2-dicarboxylate | 0.30 | 26.0 | 5.2 | 6.6 | 2.7 | 0.30 | 0.6 | 23 |

TABLE 4

| | Contents of electron donors (a) (b) | | | | Polymerization results | | | | | | | |
|---|---|---|---|---|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B) | Hydrogen MPa | Yield g | Activity kg-PE/ mmol-Ti | kg-PE/ g-catalyst | MFR g/ 10 min | [η] dl/g | Solvent-soluble component ratio % | Kind of catalyst |
| Example 25 | 2.5 | n-Propanol | 0.4 | 0.16 | Diisopropyl cis-cyclohexane-1,2-dicarboxylate | 0.75 | 44.6 | 3.0 | 4.2 | 520 | 0.57 | 11.1 | I-10 |
| Example 26 | 2.5 | | 0.4 | 0.16 | | 0.77 | 20.9 | 1.4 | 1.9 | >800 | 0.51 | 13.8 | |
| Example 27 | 2.5 | iso-Propanol | 0.4 | 0.16 | | 0.76 | 32.3 | 2.2 | 3.2 | 530 | 0.57 | 11.5 | I-11 |
| Example 28 | 2.5 | | 0.4 | 0.16 | | 0.77 | 16.0 | 1.1 | 1.6 | >800 | 0.48 | 16.3 | |
| Example 29 | 2.5 | n-Butanol | 0.4 | 0.16 | | 0.74 | 34.1 | 2.3 | 3.1 | 610 | 0.55 | 12.4 | I-12 |
| Example 30 | 2.5 | | 0.4 | 0.16 | | 0.77 | 30.7 | 2.0 | 2.8 | 740 | 0.54 | 13.4 | |
| Example 31 | 2.5 | iso-Butanol | 0.4 | 0.16 | | 0.74 | 30.4 | 2.0 | 2.5 | 530 | 0.56 | 9.9 | I-13 |
| Example 32 | 2.5 | | 0.4 | 0.16 | | 0.77 | 19.0 | 1.3 | 1.6 | >800 | 0.50 | 14.8 | |
| Example 33 | 2.5 | EtOH | 0.4 | 0.16 | Ethyl benzoate | 0.76 | 45.0 | 3.0 | 3.3 | 670 | 0.55 | 14.2 | I-15 |
| Example 34 | 2.5 | | 0.4 | 0.16 | | 0.79 | 17.7 | 1.2 | 1.3 | >800 | 0.46 | 27.4 | |
| Example 35 | 2.5 | | 0.6 | 0.24 | | 0.77 | 73.9 | 4.9 | 5.2 | 440 | 0.61 | 11.6 | I-16 |
| Example 36 | 2.5 | | 0.6 | 0.24 | | 0.78 | 46.8 | 3.1 | 3.3 | 650 | 0.56 | 14.5 | |
| Example 37 | 2.5 | | 0.4 | 0.16 | 2-Isopropyl-2-isobutyl-1,3-dimethoxypropane | 0.69 | 101.6 | 6.8 | 7.2 | 420 | 0.58 | 6.1 | I-17 |
| Example 38 | 2.5 | | 0.4 | 0.16 | | 0.72 | 84.1 | 5.6 | 6.0 | 570 | 0.55 | 7.4 | |
| Example 39 | 2.5 | | 0.6 | 0.24 | | 0.72 | 97.8 | 6.5 | 7.1 | 600 | 0.55 | 5.8 | I-18 |
| Example 40 | 2.5 | | 0.6 | 0.24 | | 0.76 | 45.7 | 3.0 | 3.3 | >800 | 0.46 | 9.5 | |
| Comparative Example 11 | 2.5 | — | — | — | Ethyl benzoate | 0.77 | 3.6 | 0.2 | 0.2 | >800 | 0.50 | 31.5 | 21 |
| Comparative Example 12 | 2.5 | — | — | — | 2-Isopropyl-2-isobutyl-1,3-dimethoxypropane | 0.74 | 32.0 | 2.1 | 2.3 | 620 | 0.55 | 10.7 | 22 |
| Comparative Example 13 | 2.5 | — | — | — | Diisopropyl cis-cyclohexane-1,2-dicarboxylate | 0.78 | 40.3 | 2.7 | 3.9 | 480 | 0.58 | 12.6 | 8 |
| Comparative Example 14 | 2.5 | — | — | — | | 0.79 | 22.7 | 1.5 | 2.2 | >800 | 0.49 | 19.2 | |

TABLE 5

| | Contents of electron donors (a) (b) | | | | | | |
|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B1) | (B1)/ MgCl$_2$ (m.r.) | Electron donor (B2) | (B2)/ MgCl$_2$ (m.r.) |
| Example 41 | 2.5 | EtOH | 0.4 | 0.16 | Ethyl benzoate | 0.05 | 2-Isopropyl- 2-isobutyl- 1,3- dimethoxy- propane | 0.05 |
| Example 42 | 2.5 | | 0.4 | 0.16 | | 0.067 | | 0.03 |
| Example 43 | 2.5 | | 0.4 | 0.16 | | 0.08 | | 0.02 |
| Example 44 | 2.5 | | 0.4 | 0.16 | | 0.085 | | 0.015 |
| Example 45 | 2.5 | | 0.4 | 0.16 | | 0.09 | | 0.01 |
| Example 46 | 2.5 | | 0.4 | 0.16 | | 0.095 | | 0.005 |
| Example 47 | 2.5 | | 0.6 | 0.24 | | 0.095 | | 0.005 |
| Example 48 | 2.5 | | 0.6 | 0.24 | | 0.09 | | 0.01 |
| Example 49 | 2.5 | | 0.6 | 0.24 | | 0.09 | | 0.01 |
| Example 50 | 2.5 | | 0.6 | 0.24 | | 0.09 | | 0.01 |
| Example 51 | 2.5 | | 0.6 | 0.24 | | 0.09 | | 0.01 |

| | Polymerization results | | | | | | |
|---|---|---|---|---|---|---|---|
| | Hydrogen MPa | Yield g | Activity kg-PE/ mmol-Ti | Activity kg-PE/ g-catalyst | MFR g/ 10 min | BD g/ml | Particle size distribution <75 μm weight % | Kind of catalyst |
| Example 41 | 0.30 | 125.8 | 25.2 | 27.8 | 3.1 | 0.32 | 2.4 | I-24 |
| Example 42 | 0.30 | 121.7 | 24.3 | 27.9 | 3.8 | 0.32 | 1.0 | I-25 |
| Example 43 | 0.30 | 106.9 | 21.4 | 23.7 | 3.8 | 0.34 | 1.2 | I-26 |
| Example 44 | 0.30 | 129.5 | 25.9 | 27.6 | 3.5 | 0.33 | 0.2 | I-27 |
| Example 45 | 0.30 | 113.6 | 22.7 | 24.7 | 2.8 | 0.34 | 0.4 | I-28 |
| Example 46 | 0.30 | 116.5 | 23.3 | 26.3 | 2.5 | 0.32 | 0.8 | I-29 |
| Example 47 | 0.30 | 148.0 | 29.6 | 33.4 | 2.5 | 0.30 | 0.2 | I-30 |
| Example 48 | 0.30 | 149.9 | 30.0 | 36.3 | 3.1 | 0.30 | 2.6 | I-31 |
| Example 49 | 0.30 | 135.2 | 27.0 | 36.1 | 2.6 | 0.30 | 1.2 | I-32 |
| Example 50 | 0.30 | 125.3 | 25.1 | 36.1 | 2.3 | 0.30 | 0.4 | I-33 |
| Example 51 | 0.30 | 118.8 | 23.8 | 38.7 | 2.1 | 0.29 | 1.2 | I-34 |

TABLE 6

| | Contents of electron donors (a) (b) | | | | | | |
|---|---|---|---|---|---|---|---|
| | EHA/ MgCl$_2$ (m.r.) | Electron donor (a) | ROH(a)/ MgCl$_2$ (m.r.) | ROH/ EHA | Electron donor (B1) | (B1)/ MgCl$_2$ (m.r.) | Electron donor (B2) | (B2)/ MgCl$_2$ (m.r.) |
| Example 52 | 2.5 | EtOH | 0.4 | 0.16 | Ethyl benzoate | 0.05 | 2-Isopropyl- 2-isobutyl- 1,3- dimethoxy- propane | 0.05 |
| Example 53 | 2.5 | | 0.4 | 0.16 | | 0.05 | | 0.05 |
| Example 54 | 2.5 | | 0.4 | 0.16 | | 0.05 | | 0.05 |
| Example 55 | 2.5 | | 0.4 | 0.16 | | 0.067 | | 0.03 |
| Example 56 | 2.5 | | 0.4 | 0.16 | | 0.067 | | 0.03 |
| Example 57 | 2.5 | | 0.4 | 0.16 | | 0.067 | | 0.03 |
| Example 58 | 2.5 | | 0.4 | 0.16 | | 0.08 | | 0.02 |
| Example 59 | 2.5 | | 0.4 | 0.16 | | 0.08 | | 0.02 |
| Example 60 | 2.5 | | 0.4 | 0.16 | | 0.08 | | 0.02 |
| Example 61 | 2.5 | | 0.4 | 0.16 | | 0.085 | | 0.015 |
| Example 62 | 2.5 | | 0.4 | 0.16 | | 0.085 | | 0.015 |
| Example 63 | 2.5 | | 0.4 | 0.16 | | 0.085 | | 0.015 |
| Example 64 | 2.5 | | 0.4 | 0.16 | | 0.09 | | 0.01 |
| Example 65 | 2.5 | | 0.4 | 0.16 | | 0.09 | | 0.01 |
| Example 66 | 2.5 | | 0.4 | 0.16 | | 0.095 | | 0.005 |
| Example 67 | 2.5 | | 0.4 | 0.16 | | 0.095 | | 0.005 |
| Example 68 | 2.5 | | 0.6 | 0.24 | | 0.095 | | 0.005 |
| Example 69 | 2.5 | | 0.6 | 0.24 | | 0.095 | | 0.005 |
| Example 70 | 2.5 | | 0.6 | 0.24 | | 0.09 | | 0.01 |
| Example 71 | 2.5 | | 0.6 | 0.24 | | 0.09 | | 0.01 |

TABLE 6-continued

| | Polymerization results | | | | | | |
|---|---|---|---|---|---|---|---|
| | | Activity kg-PE/ | | | | Solvent-soluble | |
| | Hydrogen MPa | Yield g | mmol-Ti | g-catalyst | MFR g/10 min | [η] dl/g | component ratio % | Kind of catalyst |
| Example 52 | 0.76 | 53.8 | 4.0 | 3.6 | 950 | 0.51 | 10.6 | I-24 |
| Example 53 | 0.74 | 65.7 | 4.8 | 4.4 | 650 | 0.55 | 8.6 | |
| Example 54 | 0.72 | 93.1 | 6.9 | 6.2 | 350 | 0.60 | 6.4 | |
| Example 55 | 0.76 | 54.7 | 4.2 | 3.6 | 670 | 0.55 | 10.5 | I-25 |
| Example 56 | 0.74 | 60.4 | 4.6 | 4.0 | 600 | 0.55 | 9.7 | |
| Example 57 | 0.72 | 76.5 | 5.9 | 5.1 | 380 | 0.59 | 7.8 | |
| Example 58 | 0.76 | 40.1 | 3.0 | 2.7 | 640 | 0.55 | 12.0 | I-26 |
| Example 59 | 0.74 | 52.8 | 3.9 | 3.5 | 580 | 0.56 | 9.3 | |
| Example 60 | 0.72 | 70.7 | 5.2 | 4.7 | 320 | 0.64 | 6.8 | |
| Example 61 | 0.76 | 51.2 | 3.6 | 3.4 | 950 | 0.51 | 10.3 | I-27 |
| Example 62 | 0.74 | 53.8 | 3.8 | 3.6 | 680 | 0.55 | 8.7 | |
| Example 63 | 0.72 | 67.8 | 4.8 | 4.5 | 360 | 0.62 | 7.3 | |
| Example 64 | 0.76 | 38.7 | 2.8 | 2.6 | 860 | 0.50 | 13.6 | I-28 |
| Example 65 | 0.74 | 66.6 | 4.8 | 4.4 | 360 | 0.62 | 8.1 | |
| Example 66 | 0.76 | 46.5 | 3.5 | 3.1 | 600 | 0.56 | 12.0 | I-29 |
| Example 67 | 0.74 | 65.5 | 4.9 | 4.4 | 340 | 0.55 | 8.5 | |
| Example 68 | 0.76 | 82.2 | 5.9 | 5.5 | 410 | 0.60 | 7.6 | I-30 |
| Example 69 | 0.74 | 90.2 | 6.5 | 6.0 | 360 | 0.62 | 7.5 | |
| Example 70 | 0.78 | 61.3 | 5.0 | 4.1 | 640 | 0.55 | 7.5 | I-31 |
| Example 71 | 0.79 | 50.1 | 4.0 | 3.3 | 840 | 0.52 | 8.1 | |

TABLE 7

| | Polymerization results | | | | | | |
|---|---|---|---|---|---|---|---|
| | | Activity kg-PE/ | | | | Solvent-soluble | |
| | Hydrogen MPa | Yield g | mmol-Ti | g-catalyst | MFR g/10 min | [η] dl/g | component ratio % | Kind of catalyst |
| Comparative Example 15 | 0.72 | 71.1 | 8.1 | 4.7 | 230 | 0.67 | 8.3 | 9 |
| Comparative Example 16 | 0.75 | 36.5 | 6.3 | 3.7 | 300 | 0.64 | 10.3 | 9 |
| Comparative Example 17 | 0.76 | 46.6 | 5.3 | 3.1 | 390 | 0.60 | 12.3 | 9 |
| Comparative Example 18 | 0.77 | 21.9 | 3.7 | 2.2 | 680 | 0.56 | 15.9 | 9 |
| Comparative Example 19 | 0.78 | 22.4 | 3.8 | 2.2 | 700 | 0.55 | 15.6 | 9 |
| Comparative Example 20 | 0.79 | 20.6 | 2.3 | 1.4 | 1500 | 0.46 | 24.1 | 9 |

INDUSTRIAL APPLICABILITY

It can be found from the results that the ethylene polymerization catalysts of the present invention have the excellent characteristics of a high polymerization activity, a high hydrogen response for controlling a molecular weight and a low content of solvent-soluble components.

The invention claimed is:

1. A solid titanium catalyst component (I) for ethylene polymerization, wherein the component (I) is obtained by bringing a liquid magnesium solution (A) comprising a magnesium compound, an electron donor (a), and an electron donor (b) into contact with a liquid titanium compound (C) under the presence of an electron donor (B) and wherein the component (I) comprises titanium, magnesium and a halogen, wherein the electron donor (a) is an alcohol having 1 to 5 carbon atoms, and the electron donor (b) is an alcohol having 6 to 30 carbon atoms wherein the electron donor (B) is a compound represented by the following Formula (2):

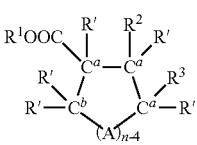

(2)

wherein in Formula (2), $C^a$ and $C^b$ represent a carbon atom; n represents an integer of 5 to 10; $R^2$ and $R^3$ each are independently $COOR^1$ or $R'$, and at least one of $R^2$ and $R^3$ is $COOR^1$; in a cyclic framework, any carbon-carbon bond other than a $C^a$-$C^a$ bond and a $C^a$-$C^b$ bond when $R^3$ is a hydrogen atom may be substituted with a double bond;

a plurality of $R^1$ is a hydrocarbon group having 1 to 20 carbon atoms;

a plurality of R' each is independently an atom or a group selected from a hydrogen atom, a hydrocarbon group having 1 to 20 carbon atoms, a halogen atom, a nitrogen-containing group, an oxygen-containing group, a phosphorus-containing group, a halogen-containing group and a silicon-containing group;

A is a structure represented by the following formula or a hetero atom excluding an oxygen atom:

wherein a plurality of R' is the same as R' described above;

a ring formed by $C^a$, $C^b$ and A is a saturated alicyclic structure, wherein a molar ratio between the electron donor (b) and a titanium atom each contained in the solid titanium catalyst component (I) is 0.2 to 10.

2. The solid titanium catalyst component (I) for ethylene polymerization as described in claim 1, wherein the molar ratio ((a)/(b)) of the used amount of the electron donor (a) to the used amount of the electron donor (b) is less than 0.8.

3. The solid titanium catalyst component (I) for ethylene polymerization as described in claim 1, wherein the electron donor (b) is an alcohol having 6 to 12 carbon atoms.

4. An ethylene polymerization catalyst comprising the solid titanium catalyst component (I) for ethylene polymerization as described in claim 1 and an organic metal compound catalyst component (II).

5. An ethylene polymerization method comprising homopolymerizing ethylene or copolymerizing ethylene with other olefins under the presence of the ethylene polymerization catalyst as described in claim 4.

6. The solid titanium catalyst component (I) for ethylene polymerization as described in claim 1, wherein a molar ratio between the electron donor (a) and a titanium atom each contained in the solid titanium catalyst component (I) is 0.01 to 10.

* * * * *